(12) United States Patent
Gottlieb

(10) Patent No.: US 8,902,272 B1
(45) Date of Patent: Dec. 2, 2014

(54) MULTIPARTY COMMUNICATIONS SYSTEMS AND METHODS THAT EMPLOY COMPOSITE COMMUNICATIONS

(75) Inventor: Steven M. Gottlieb, New York, NY (US)

(73) Assignee: Shindig, Inc., New York, NY (US)

( * ) Notice: Subject to any disclaimer, the term of this patent is extended or adjusted under 35 U.S.C. 154(b) by 1409 days.

(21) Appl. No.: 12/624,848

(22) Filed: Nov. 24, 2009

Related U.S. Application Data

(60) Provisional application No. 61/117,477, filed on Nov. 24, 2008, provisional application No. 61/117,483, filed on Nov. 24, 2008, provisional application No. 61/145,107, filed on Jan. 15, 2009.

(51) Int. Cl.
*H04N 7/14* (2006.01)

(52) U.S. Cl.
USPC .................................................. 348/14.01

(58) Field of Classification Search
USPC .................................................. 348/14.01
See application file for complete search history.

(56) References Cited

U.S. PATENT DOCUMENTS

| | | | |
|---|---|---|---|
| 6,044,146 A | 3/2000 | Gisby et al. | |
| 6,241,612 B1 | 6/2001 | Heredia | |
| 6,259,471 B1 | 7/2001 | Peters et al. | |
| 6,559,863 B1 | 5/2003 | Megiddo | |
| 6,654,346 B1 | 11/2003 | Mahalingaiah et al. | |
| 6,697,614 B2 | 2/2004 | Dorenbosch | |
| 7,478,129 B1 | 1/2009 | Chemtob | |
| 7,487,211 B2 | 2/2009 | Beavers et al. | |
| 7,495,687 B2 | 2/2009 | DuMas et al. | |
| 7,515,560 B2 | 4/2009 | DuMas et al. | |
| 7,593,032 B2 | 9/2009 | Civanlar et al. | |
| 8,144,187 B2 | 3/2012 | Moore et al. | |
| 8,225,127 B2 | 7/2012 | Vonog et al. | |
| 2002/0094831 A1 | 7/2002 | Maggenti et al. | |
| 2005/0032539 A1 | 2/2005 | Noel et al. | |
| 2005/0132288 A1 | 6/2005 | Kirn et al. | |
| 2005/0262542 A1 | 11/2005 | DeWeese et al. | |
| 2006/0055771 A1 | 3/2006 | Kies | |

(Continued)

FOREIGN PATENT DOCUMENTS

| | | |
|---|---|---|
| EP | 0721726 B1 | 12/2000 |
| GB | 2446529 A | 8/2008 |
| WO | 2009077936 A2 | 6/2009 |

OTHER PUBLICATIONS

About TokBox, Inc., All about TokBox, http://www.tokbox.com/about, retrieved Feb. 4, 2011, p. 1.

(Continued)

*Primary Examiner* — Maria El-Zoobi
(74) *Attorney, Agent, or Firm* — Robert W. Morris; Eckert Seamans

(57) ABSTRACT

Improved methods, systems, and devices for managing communications are provided. A user device may display all ongoing communications so that a user can visualize the communications network or some subset thereof (e.g., a subgroup or group of users). A system may maintain the user device in an instant ready-on mode of communication with the other user devices. A user may then initiate communications with a subgroup (e.g., a pair) or group without initiating a new connection. Accordingly, a user can simultaneously and fluidly communicate at the subgroup level, at the group level, or at the inter-group level. Moreover, users can function as independent actors that can freely form and leave subgroups as well as groups.

25 Claims, 20 Drawing Sheets

(56) References Cited

U.S. PATENT DOCUMENTS

| | | |
|---|---|---|
| 2006/0063555 A1 | 3/2006 | Robbins |
| 2006/0140138 A1 | 6/2006 | Hill |
| 2007/0265074 A1 | 11/2007 | Akahori et al. |
| 2008/0002668 A1 | 1/2008 | Asokan et al. |
| 2008/0037763 A1 | 2/2008 | Shaffer et al. |
| 2008/0136898 A1* | 6/2008 | Eisenberg et al. ......... 348/14.09 |
| 2008/0137559 A1 | 6/2008 | Sasaki et al. |
| 2008/0181260 A1 | 7/2008 | Vonog et al. |
| 2008/0274810 A1 | 11/2008 | Hayashi et al. |
| 2009/0033737 A1 | 2/2009 | Goose et al. |
| 2009/0040289 A1 | 2/2009 | Hetherington et al. |
| 2009/0209339 A1 | 8/2009 | Okada |
| 2009/0249244 A1 | 10/2009 | Robinson et al. |
| 2010/0122184 A1 | 5/2010 | Vonog et al. |
| 2010/0316232 A1* | 12/2010 | Acero et al. ............ 379/202.01 |
| 2011/0258474 A1 | 10/2011 | Vonog et al. |
| 2012/0084672 A1 | 4/2012 | Vonog et al. |
| 2012/0198334 A1 | 8/2012 | Surin et al. |
| 2012/0254649 A1 | 10/2012 | Vonog et al. |

OTHER PUBLICATIONS

CrunchBase Profile, CrunchBase readeo, http://www.crunchbase.com/company/readeo, retrieved Feb. 3, 2011, pp. 1-2.

CrunchBase Profile, CrunchBase Rounds, http://www.crunchbase.com/company/6rounds, retrieved Feb. 4, 2011, pp. 1-2.

CrunchBase Profile, CrunchBase TokBox, http://www.crunchbase.com/company/tokbox, retrieved Feb. 4, 2011, pp. 1-3.

Oneline Collaboration GoToMeeting, http://www.gotomeeting.com/fec/online_collaboration, retrieved Feb. 4, 2011, pp. 1-4.

Readeo Press Release, www.mmpublicity.com, Feb. 25, 2010, pp. 1-2.

Rounds.com, Make friends online and enjoy free webcam chats, http://www.rounds.com/about, retrieved Feb. 4, 2011, pp. 1-3.

* cited by examiner

MULTIPARTY COMMUNICATIONS SYSTEMS AND METHODS THAT EMPLOY COMPOSITE COMMUNICATIONS

CROSS-REFERENCE TO RELATED APPLICATIONS

This application claims the benefit of U.S. Provisional Application Nos. 61/117,477 and 61/117,483, both filed Nov. 24, 2008, the disclosures of which are incorporated by reference herein in their entirety. This application further claims the benefit of U.S. Provisional Application No. 61/145,107, filed Jan. 15, 2009, the disclosure of which is also incorporated by reference herein in its entirety.

BACKGROUND OF THE INVENTION

This relates to methods, systems and devices for managing communications between groups of people. The disclosure can be applied to audio, text, video, any other suitable communications medium, or any combination thereof. The disclosure can be applied to telecommunications networks, radio networks, the Internet, or any other type of communications network.

Traditional communications networks are rigid an inflexible. For example, traditional communications networks may only allow devices to form single-use connections with other devices, and those single-use connections must be established from scratch before any communications can begin. By establishing a separate single-use connection for each new communication, traditional systems provide a choppy user experience that includes initiation delays. Moreover, traditional communication networks do not allow users to seamlessly move in and out of communications with pre-existing groups of users. This can prevent users from interacting in a fluid manner.

Traditional communications networks also provide inadequate functionality for calls amongst multiple users. For example, traditional communications network may only allow devices to form new communications as one of two types: a direct communication with a single other user or a "conference" or "party" communication amongst multiple users. In the "conference" or "party" communication, all users are given an equal opportunity to provide input (e.g., all users can speak at once) and all input is treated as having an equal priority so that all input is provided to the receiving user in the same manner. Moreover, the "shared" line of a "conference" or "party" communication provides the identical experience (i.e., audio output) to all users. For example, traditional communications networks are inadequate at managing multiple, simultaneous communications. Most traditional networks will simply display the communications in parallel with minimal distinction. Moreover, the traditional networks are largely devoid of mechanisms for combining communications of different media (e.g., audio, text, and video).

Accordingly, in traditional communications networks, both types of traditional communication—direct communications between two users and "conference" or "party" communications amongst multiple users—provide a unitary option where an individual user either opts into or out of a particular communication but creating any additional communication requires opening up a wholly new communications channel which has no interaction with the pre-existing communication and does not share architecture, efficiencies or features with the pre-existing communication.

SUMMARY OF THE INVENTION

Improved methods, systems, and devices for managing communications are provided. In some embodiments, multiple user devices may be maintained in an instant ready-on mode of communication. The instant ready-on mode of communication can, for example, allow each of the users a multiplicity of choices as to how they communicate with each of the other instant ready-on users. Moreover, the instant ready-on mode of communication may also allow users to act as independent actors within a communication network or large group of connected users. For example, multiple devices may be maintained in an instant ready-on mode of communication so that the devices can communicate amongst each other without establishing a new communication link. For example, for two devices to communicate with each other, the devices may convert a pre-existing communication link to an active mode of communication. Compared to the traditional process that requires establishing a new communication link for each new communication, converting a pre-existing communication link to an active mode can occur nearly instantaneously.

In accordance with some embodiments, a user device may display multiple ongoing communications so that a user can visualize the communications network. For example, large communication networks may include many groups and subgroups and the user may not be a member of every group and subgroup. However, the system may maintain the user's device in an instant ready-on mode of communication with the other user devices in the network. A user may then initiate communications with a subgroup or group (e.g., by joining an existing subgroup or group or forming a new subgroup or group) without initiating a new communication link. Accordingly, a user can simultaneously and fluidly communicate at the subgroup level, at the group level, or at the inter-group level.

In accordance with some embodiments, communications of various types of media can be combined and presented to a user. For example, a communications network can provide video communications, audio communications, text communications or any suitable combination thereof. In some embodiments, a user communicating in a group that uses video may appear as a static image if video communications are unavailable (e.g., the user chooses not to provide video communications or the user's device doesn't support video communications). In some embodiments, a user communicating in a group that uses video may communicate using automatically generated speech based on the user's text communications. Accordingly, existing communications protocols can be enhanced by adding a missing component (e.g., video or audio) to communications. Moreover, a user can seamlessly switch between communications that use different media in a comprehensible and fluid manner.

In accordance with the disclosure, a communication system may adjust or prioritize communications based on any suitable factor or combination of factors. In some embodiments, a system can recognize when users are amenable to lesser-quality communications on an individualized basis. In some embodiments, this information about which users can accept lesser-quality communications can be transmitted to the communication's source to enable the quality and amount of data to be downgraded accordingly. To determine which users are amenable to less-quality communications, a system might either allow users to set individual communications at different levels of priority or it may monitor users' activities to determine which activities are most important to the user. In some embodiments, a user may provide an input indicating that it is acceptable to view particular communications at a lesser-quality. Accordingly, a communication can be provided at a quality suitable for the context of the communication, and the use of the network can be optimized so that users may experience less delay when communicating through the system.

In accordance with some embodiments, simultaneous incoming communications (e.g., conflicting communications) can be prioritized based on one or more criteria. Suitable criteria include, for example, length of the communication, user associated with the device transmitting the communication or number of users receiving the communication. For example, shorter communications may be given priority over length, ongoing communications (e.g., a presentation). In another example, a communication sent from one user to another user might be given priority over a group communications because, for example, communications between a pair of users is likely to be more important than communications broadcast to an entire group.

In some embodiments, prioritization of communications can occur by converting a less important communication into a secondary medium. For example, a less important audio communications can be converted to text using voice-recognition software. In some embodiments, prioritization of communications can occur by delaying a less important communication (e.g., time-shifting). For example, a less important communication can be saved for later playback. In some embodiments, prioritization of communications can occur by adjusting the relative prominence of one or more communications. For example, the volume of audio communications can be adjusted to make less important communications less prominent. In another example, the size or screen location of text or video communications can be adjusted to make less important communications less prominent.

In accordance with some embodiments, communications can be adjusted based on one or more factors. In some embodiments, communications can be adjusted based on the mode of communication between the transmitting user and the receiving user. For example, if the transmitting user and the receiving user are in an intermediate mode of communication (e.g., the users are members of the same group but not actively discussing anything amongst each other), the users may be provided with contextual communications (e.g., lesser-quality communications). In some embodiments, such contextual communications may include intermittent video or a periodically updated image. In some embodiments, such contextual communications may include low-resolution or grayscale video communications. Accordingly, the contextual communications may reduce bandwidth demands on the network if the communications are not part of an active discussion amongst the transmitting and receiving users. Moreover, the contextual communications may be less prominent than those communications which are part of an active discussion amongst users. For example, if the transmitting user and the receiving user are in an active mode of communication (e.g., the users are discussing something), the users may be provided with robust communications (e.g., high-resolution, color video at a standard refresh rate). Yet another advantage of contextual communications is that the communications may provide presence information about the transmitting user. For example, a server or a receiving user can determine that the transmitting user is available to communicate based on the contextual communications. In some embodiments, communications can be adjusted based on available bandwidth. For example, a communications network may determine the available bandwidth between two or more nodes and then adjust communications based on the determined bandwidth. In this manner, contextual communications can be provided that are appropriate for the available bandwidth. Moreover, in some embodiments, the communications network may even instruct a transmitting device to generate contextual communications if there is only a small amount of available bandwidth between the transmitting device and the network.

While the previous discussion included various examples of techniques for providing lesser-quality communications (e.g., contextual communications), it is understood that any suitable technique or combination of techniques can be used to provide lesser-quality communications in accordance with the disclosure. In some embodiments, a system can provide lesser-quality communications (e.g., contextual communications) by displaying communications in a perspective mode so that communications of a lesser priority occupy less visual space and are less visually competitive. For example, communications of a lesser priority may be provided at a perspective so that communications displayed directly (e.g., at a straight-on angle) can be more prominent. While occupying less space and less visually competitive, communications provided in a perspective mode can still be of sufficient quality for scanning, monitoring or viewing the communications. In some embodiments, a system can provide lesser-quality communications (e.g., contextual communications) by providing communications in reduced gradients of color, grayscale or black-and-white. In some embodiments, a system can provide lesser-quality communications (e.g., contextual communications) by providing communications at reduced refresh rates. In some embodiments, a system can provide lesser-quality communications (e.g., contextual communications) by providing downgraded communications appear translucent. While the previous embodiments describe techniques in which lesser-quality communications (e.g., contextual communications) can be provided, it is understood that any suitable technique, include any combination of the previously described techniques, can be used to provide lesser-quality video in a manner that optimizes the system's data transmissions.

In accordance with some embodiments, a communications network can generate composite communications. In some embodiments, a communications network can receive communications from multiple users, each of which is directed to the same user, and generate a composite communication directed to the receiving user. For example, the composite communication can be derived from the received communications so that the receiving user can receive a single communication with the content of all of the received communications directed to that user. Moreover, in some embodiments, video game output and pre-recorded video (e.g., video clips, television shows or movies) can be incorporated into the composite communication directed to the receiving user. In this manner, the receiving user can receive a single communication (e.g., a single video stream) and the bandwidth consumed by the system can be minimized.

In some embodiments, a communications network can receive communications from multiple users, each of which is directed to the same user, and create a combined audio signal based on audio signals from the received communications. Such a combined audio signal can be created to assist the receiving user in identifying the source of each audio communication. For example, an arbitrary spatial location can be assigned to each received communication (or each transmitting user) and the combined audio signal can be created to convey to the user that the audio in the received signal is originating from the arbitrary spatial location. Moreover, the video from the received communication can be displayed at an area of the receiving user's display that corresponds to the arbitrary spatial location. In this manner, the user may easily recognize that the audio from the received communication is associated with the video from the received communication. It is understood that creating audio separation through varying multichannel levels such that each audio stream is easier to distinguish and appears to have a different location is a technique that can be utilized either separately or in combination with the previously discussed technique of compositing signals.

In accordance with some embodiments, a user can view communications within subgroups and groups, even if the user is not a party to the communications. For example, a user device may display all ongoing communications so that a user can visualize the communications network. Displaying information about a subgroup or group to a user that is not within the particular subgroup or group may be referred to as inter-subgroup or intergroup communications. Accordingly, intergroup communications can allow users on the communications network to receive communications from other users that are not necessarily in the same group. In some embodiments, intergroup communications can allow a user to effectively mingle between groups, lookup specific users in the network, scan the identities of users in a specific group or perform any other suitable operation involving another group. In some embodiments, a user may enter into a visible subgroup or group based on inter-subgroup or intergroup communications. In some embodiments, if the subgroup or group is private, the user may request access (e.g., by "knocking"). Once a member of the subgroup or group, the user may be able to visualize combinations amongst the members of the subgroup or group. In some embodiments, each user may be able to specify the visibility of his communications. For example, a user can choose to make his communications visible to everyone on the network, only friends, only users within the same group, only users within the same subgroup, or any other suitable collection of users. For example, a user may choose to make his communications completely hidden to those whom with he is not communicating.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
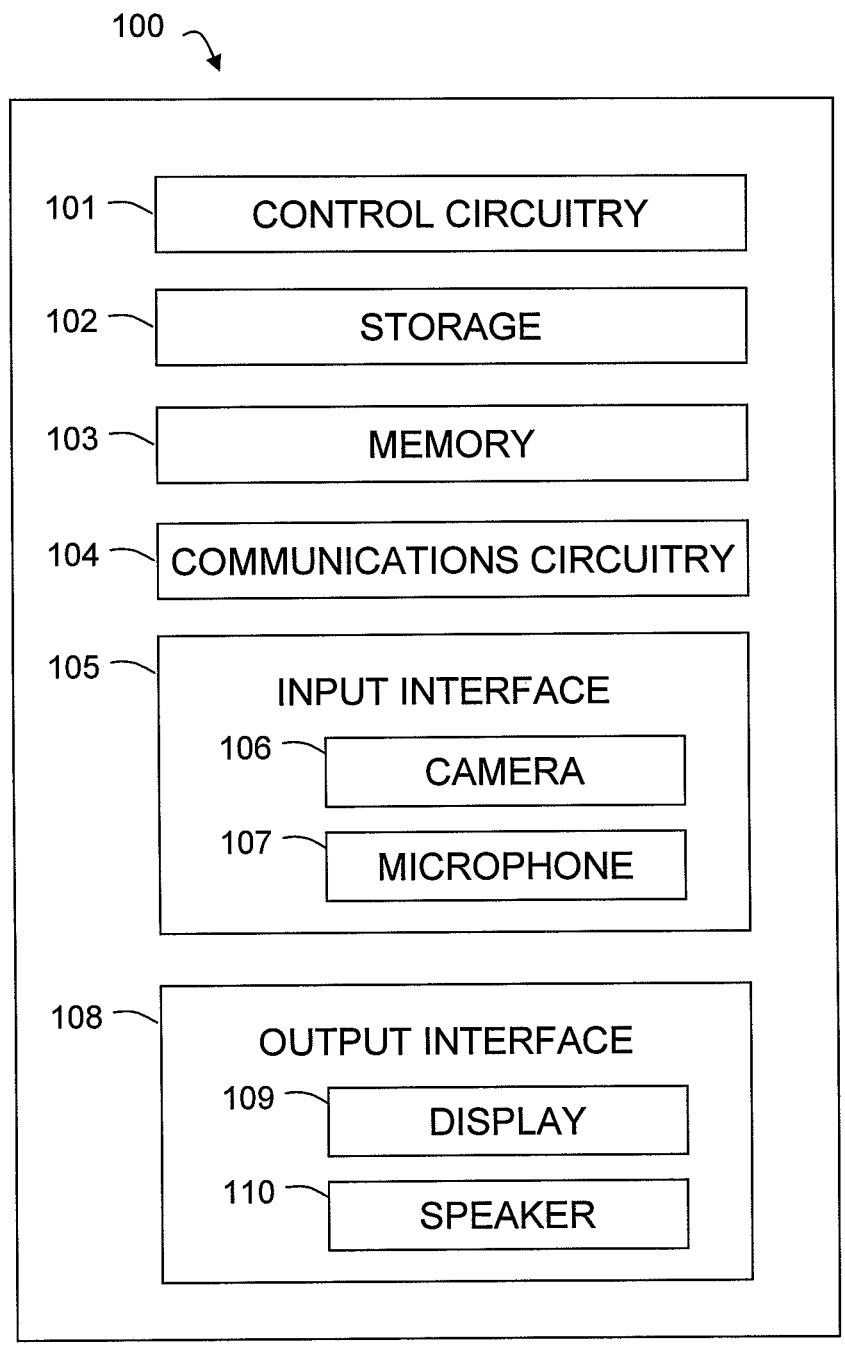
FIG. 1 is a block diagram of an illustrative user device for communicating in accordance with one embodiment of the invention.

In accordance with the disclosure, communications can be provided through users devices. For example, multiple users can each operate an individual user device and communicate with each other through the user device. FIG. 1 is a schematic view of an illustrative user device for communicating in accordance with one embodiment of the invention. User device 100 can include control circuitry 101, storage 102, memory 103, communications circuitry 104, input interface 105 and output interface 108. In some embodiments, one or more of the components of user device 100 can be combined or omitted. For example, storage 102 and memory 103 can be combined into a single mechanism for storing data. In some embodiments, user device 100 can include other components not combined or included in those shown in FIG. 1, such as a power supply (e.g., a battery or kinetics) or a bus. In some embodiments, user device 100 can include several instances of the components shown in FIG. 1 but, for the sake of simplicity, only one of each of the components is shown in FIG. 1.

User device 100 can include any suitable type of electronic device operative to communicate with other devices. For example, user device 100 can include a personal computer (e.g., a desktop personal computer or a laptop personal computer), a portable communications device (e.g., a cellular telephone, a personal e-mail or messaging device, a pocket-sized personal computer, a personal digital assistant (PDA)), or any other suitable device for communicating.

Control circuitry 101 can include any processing circuitry or processor operative to control the operations and performance of a user device of the type of user device 100. Storage 102 and memory 103, which can be combined can include, for example, one or more storage mediums or memory used in an electronic device of the type of user device 100.

Communications circuitry 104 can include any suitable communications circuitry operative to connect to a communications network and to transmit communications (e.g., voice or data) from device 100 to other devices within the communications network. Communications circuitry 104 can be operative to interface with the communications network using any suitable communications protocol such as, for example, Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In some embodiments, communications circuitry 104 can be operative to provide wired communications paths for user device 100.

Input interface 105 can include any suitable mechanism or component for receiving inputs from a user. In some embodiments, input interface 105 can include camera 106 and microphone 107. In some embodiments, input interface can include a controller, joystick, keyboard, mouse, any other suitable mechanism for receiving user input or any combination thereof. Input interface 105 can also include circuitry operative to convert (and encode/decode, if necessary) analog signals and other signals into digital data, for example in any manner typical of an electronic device of the type of user device 100. Any mechanism or component in input interface 105 can be electrically coupled with control circuitry 101, storage 102, memory 103, communications circuitry 104, any other suitable components within device 100, or any combination thereof.

Camera 106 can include any suitable component for detecting images. For example, camera 106 can detect single pictures or video frames. Camera 106 can include any suitable type of sensor for detecting images. In some embodiments, camera 106 can include a lens, one or more sensors that generate electrical signals and circuitry for processing the electrical signals generated by the one or more sensors. The sensors of camera 106 can be provided on a charge-coupled device (CCD) integrated circuit, for example. Camera 106 can be electrically coupled with control circuitry 101, storage 102, memory 103, communications circuitry 104, any other suitable components within device 100, or any combination thereof.

Microphone 107 can include any suitable component for detecting audio signals. For example, microphone 107 can include any suitable type of sensor for detecting audio signals. In some embodiments, microphone 107 can include one or more sensors that generate electrical signals and circuitry for processing the electrical signals generated by the one or more sensors. Microphone 107 can be electrically coupled with control circuitry 101, storage 102, memory 103, communications circuitry 104, any other suitable components within device 100, or any combination thereof.

Output interface 108 can include any suitable mechanism or component for providing outputs to a user. In some embodiments, output interface 108 can include display 109 and speaker 110. Output interface 108 can also include circuitry operative to convert (and encode/decode, if necessary) digital data into analog signals and other signals, for example in any manner typical of an electronic device of the type of user device 100. For example, output interface 108 can include circuitry operative to convert digital data into analog signals for use by an external display or speaker. Any mechanism or component in output interface 108 can be electrically coupled with control circuitry 101, storage 102, memory 103, communications circuitry 104, any other suitable components within device 100, or any combination thereof.

Display 109 can include any suitable mechanism for displaying visual content (e.g., images or indicators representing data). For example, display 109 can include a thin-film transistor liquid crystal display (LCD), an organic liquid crystal display (OLCD), a plasma display, a surface-conduction electron-emitter display (SED), organic light-emitting diode display (OLED), or any other suitable type of display. Display 109 can be electrically coupled with control circuitry 101, storage 102, memory 103, any other suitable components within device 100, or any combination thereof. Display 109 can display images stored in device 100 (e.g., stored in storage 102 or memory 103), images captured by device 100 (e.g., captured by camera 106), or images received by device 100 (e.g., images received from communications circuitry 104). In some embodiments, display 109 can display communication images that communications circuitry 104 receives from other devices (e.g., other instances of device 100). Display 109 can be electrically coupled with control circuitry 101, storage 102, memory 103, communications circuitry 104, any other suitable components within device 100, or any combination thereof.

Speaker 110 can include any suitable mechanism for providing audio content. For example, speaker 110 can include a speaker for broadcasting audio content to a general area (e.g., a room in which device 100 is located). In another example, speaker 110 can include headphones or ear buds for broadcasting audio content directly to a user in private. Speaker 110 can be electrically coupled with control circuitry 101, storage 102, memory 103, communications circuitry 104, any other suitable components within device 100, or any combination thereof.

Figure 2:
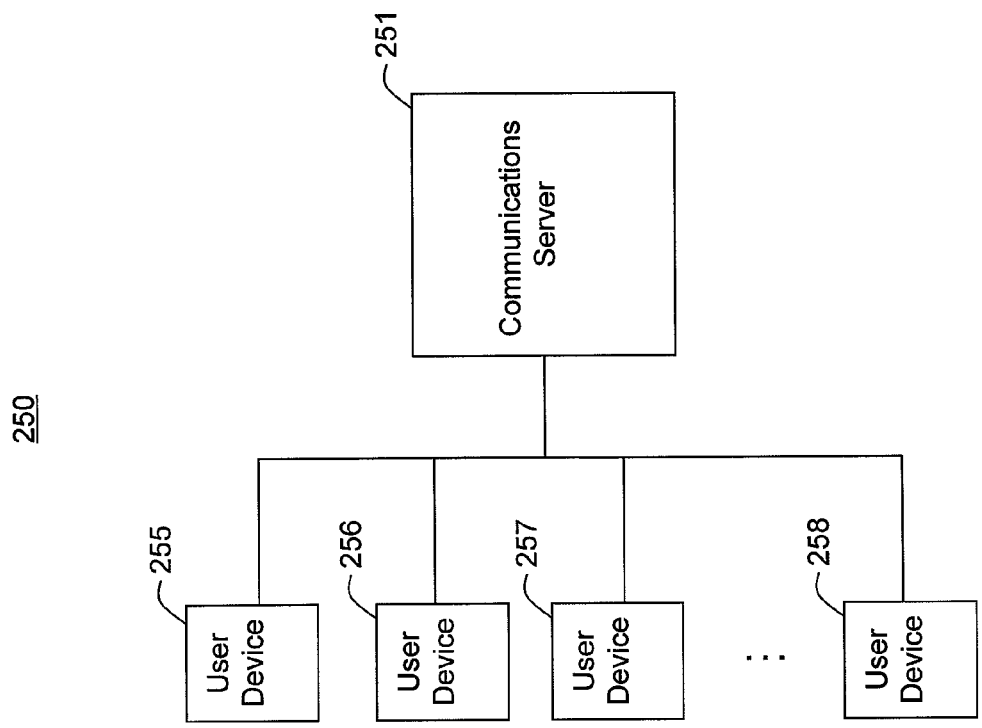
FIG. 2 is a schematic view of an illustrative communications system in accordance with one embodiment of the invention.

In some embodiments, a communications system may include multiple user devices and a server. FIG. 2 includes communications system 250 in accordance with one embodiment of the invention. Communications system 250 can facilitate communications amongst a collection of users, or any subset thereof, in accordance with the disclosure.

Communications system 250 may include at least one communications server 251. Communications server 251 can be any suitable server for facilitating communications between two or more users. For example, server 251 may include several interconnected computers running software to control communications.

Communications system 250 may include several user devices 255-258. Each of user devices 255-258 may be substantially similar to user device 100 shown in FIG. 1 and the previous description of the latter can be applied to the former. Communications server 251 may be coupled with user devices 255-258 through any suitable network. For example, server 251 may be coupled with user devices 255-258 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. In some embodiments, each user device may correspond to a single user. For example, user device 255 may correspond to a first user and user device 256 may correspond to a second user. Server 251 may control communications between two or more of the user devices. For example, server 251 may control one-to-one communications between user device 255 and 256 and/or multi-party communications between user device 255 and user devices 256-258. Each user device may provide outputs to a user and receive inputs from the user when facilitating communications. For example, a user device may include an input interface (see, e.g., input interface 105 shown in FIG. 1) for receiving communication inputs from a user and an output interface (see, e.g., output interface 108 shown in FIG. 1) for providing communication outputs to a user.

In some embodiments, communications system 250 may be coupled with one or more other systems for providing additional functionality. For example, communications system 250 may be coupled with a video game system for providing video games to users communicating amongst each other through system 250. A more detailed description of system for providing video games to users communicating amongst each other can be found in U.S. Provisional Patent Application 61/145,107, which has been incorporated by reference herein. In another example, communications system 250 may be coupled with a media system for providing media (e.g., audio and/or video content) to users communicating amongst each other through system 250.

While only one communications server (e.g., server 251) and four communications user devices (e.g., devices 255-258) are shown in FIG. 2, it is understood that any number of servers and user devices can be provided in accordance with the disclosure.

Each user can have his own addressable user device through which the user communicates (e.g., devices 255-258). The identity of these user devices can be stored into a central system (e.g., communications server 250). The central system can further include a directory of all users and/or user devices. This directory may be accessible by or replicated in each device in the communications network.

The user associated with each address can be displayed via a visual interface on a device (e.g., an LCD screen). Each user can be represented by a video, picture, graphic, text, any other suitable identifier, or any combination thereof. If there is limited display space, a device may limit the number of users displayed at one time. For example, the device may include a directory structure for organizing users. In another example, the device may include a search function and accept search queries from the device's user.

As previously discussed, multiple communications media can be supported. Accordingly, a user can choose which communications medium to use when initiating a communication with another user, subgroup or group. In embodiments which include the previously discussed feature whereby missing communications components are generated and provided, the user's choice of communications medium may be unlimited by the preferences of other users or the capabilities of their devices. However, a system may still provide a user with the preferences of other users and/or the capabilities of their devices when the user is selecting a communications medium. In some embodiments, a user may choose a combination of communications media when initiating a communication. For example, a user can choose video as the primary medium and text as a secondary medium.

In some embodiments, a system can maintain different user devices in different communications modes. A system can maintain the devices of users that are actively communicating together in an active communication mode that allows the devices to send and receive robust communications. For example, devices in the active communication mode can send and receive live video communications so that the corresponding users can conduct a discussion. In some embodiments, devices in the active communication mode can send and receive high-resolution, color videos. For users that are in the same group but not actively communicating together, a system can maintain the users' devices in an intermediate communication mode. In the intermediate communication mode, the devices can send and receive contextual communications. For example, the devices can send and receive intermittent video communications or periodically updated images. Such contextual communications may be suitable for devices in an intermediate mode of communication because the corresponding users are not actively communicating with each other. For devices that are not involved in active communications or not members of the same group, the system can maintain an instant ready-on mode of communication. The instant ready-on mode of communication can establish a communication link between each device so that, if the devices later communicate in a more active manner, the devices do not have to establish a new communication link. The instant ready-on mode can be advantageous because it can minimize connection delays when entering groups and/or establishing active communications. Moreover, the instant ready-on mode of communication enables users to fluidly join and leave groups and subgroups without creating or destroying connections. For example, if a user enters a group with thirty other users, the instant ready-on mode of communication between the user's device and the devices of the thirty other users may be converted to an intermediate mode of communication. Once an intermediate mode of communication is established, the user may send and receive contextual communications (e.g., periodically updated images) to and from the thirty other users. Continuing the example, if the user then enters into a subgroup with two of the thirty other users, the intermediate mode of communication between the user's device and the devices of the two users may be converted (e.g., transformed or enhanced) to an active mode of communication. For example, if the previous communications through the intermediate mode only included an audio signal and a still image from each of the two other users, the still image of each user may fade into a video of the user so that robust video communications can occur. In another example, if the previous communications through the intermediate mode only included an audio signal and a video with a low refresh rate (e.g., an intermittent video or a periodically updated image) from each of the two other users, the refresh rate of the video may be increased so that robust video communications can occur. Once a lesser mode of communication (e.g., an instant ready-on mode or an intermediate mode) has been upgraded to an active mode of communication, the user may send and receive robust video communications to and from the users. In this manner, a user's device may concurrently maintain multiple modes of communication with various other devices based on the user's communication activities. Continuing the example yet further, if the user leaves the subgroup and group, the user's device may convert to an instant ready-on mode of communication with the devices of all thirty other users.

As previously discussed, a user can communicate with one or more subgroups. For example, if a user wants to communicate with certain members of a group, the user can select those members and initiate a subgroup communication. Frequently used group rosters may be stored so that a user does not have to select the appropriate users every time the group is created. After a subgroup has been created, each member of the subgroup may be able to view the indicators of the subgroup on his device's display. For example, each member of the subgroup may be able to see who is in the subgroup and who is currently transmitting communications to the subgroup. A user can specify if he wants to communicate with the whole group or a subset of the group (e.g., a subgroup). For example, a user can specify that he wants to communicate with various users in the group or even just a single other user in the group. As previously discussed, when a user is actively communicating with one or more other user, the user's device and the device(s) of the one or more other users enter an active mode of communication. Because the instant ready-on mode of communication remains intact for the other devices, the user can initiate communications with multiple groups or subgroups and then quickly switch from any one group or subgroup. For example, a user can specify if a communication is transmitted to different groups or different individuals within a single group.

Recipients of a communication can respond to the communication. In some embodiments, recipients can respond, by default, to the entire group that received the original communication. In some embodiments, if a recipient chooses to do so, the recipient may specify that his response is sent to only the user sending the initial communication, some other user or some other subgroup or group of users. However, it is understood that in other embodiments, a user may be a member of a subgroup until he decides to withdraw from the subgroup and, during the time that he is a member of the subgroup, all of his communications may be provided to the other members of the subgroup. For example, a video stream may be maintained between the user and each other user that is a member of the subgroup until the user withdraws from the subgroup.

In some embodiments, the system can monitor all ongoing communications and store the information. For example, the system may store recorded video of video communications, recorded audio of audio-only communications and recorded transcripts of text communications. In another example, a system may transcribe all communications to text and stores transcripts of the communications. By accessing the information, a user may review all communications going on at any given time and the participants (e.g., transmitters and recipients) of such communications.

In some embodiments, a system can provide indicators about communications. For example, a system can provide indicators that convey who sent a particular communication, which users a particular communication was directed to, which users are in a subgroup, or any other suitable feature of communications. In some embodiments, a user device may include an output interface (see, e.g., output interface 108 shown in FIG. 1) that can separately provide communications and indicators about the communications. For example, a device can include an audio headset for providing communications along with a display screen for providing indicators about the communications. In some embodiments, a user device may include an output interface (see, e.g., output interface 108 shown in FIG. 1) that can provide communications and indicators about the communications through the same media. For example, a device may include a display screen for providing video communications and indicators about the communications.

In accordance with one embodiment, the disclosed features can be incorporated into party calls utilizing Voice Over Internet Protocol (VOIP). A system may store the IP address of each user's device. Each device may show all users on a party call through graphical representations (e.g., a participant's photograph), alphanumeric representations (e.g., a participant's name) in a grid, or live images from cameras. If a user wants to address a communication to a subset of the group (e.g., a subgroup) the user can simply select the desired users. As previously discussed, when the user selects the desired users, the communication mode between the user's device and the device of the selected users may be upgraded to an active mode of communication so that the users in the subgroup can send and receive robust communications. In some embodiments, the representations of the users can be rearranged so that the selected users are evident. For example, the sequence of the graphical representations corresponding to the users in the subgroup can be adjusted, or the graphical representations corresponding to the users in the subgroup can be highlighted, enlarged, colored, made easily distinguishable in any suitable manner, or any combination thereof. The display on each participating user's device may change with each communication in this manner. Accordingly, the subgroup to which a user is communicating may be clear both to the initiating user and the recipients.

In some embodiments, a user may have the option of downgrading pre-existing communications and initiating a new communication by providing a user input (e.g., sending a new voice communication). In some embodiments, a user can downgrade a pre-existing communication by placing the pre-existing communication on mute so that any new activity related to the pre-existing communication may be placed in a cue to receive later. In some embodiments, a user can downgrade a pre-existing communication by moving the pre-existing communication into the background (e.g., reducing audio volume and/or reducing size of video communications) while simultaneous participating in the new communication. In some embodiments, when a user downgrades a pre-existing communication, the user's status may be conveyed to all other users participating in the pre-existing communication. For example, the user's indicator may change to reflect that the user has stopped monitoring the pre-existing communication In some embodiments, indicators representing communications can be automatically saved along with records of the communications. Suitable indicators include identifiers of each transmitting user and the date and time of each communication. For example, a conversation that includes group audio communications may be converted to text communications that include indicators representing each communication's transmitter (e.g., the speaker) and the date and time of each communication. Active transcription of the communications may be provided in real time and displayed to each participating user. For example, subtitles may be generated and provided to users participating in video communications.

In some embodiments, a system can have the effect of putting all communications by a specific selected group of users in one place. Therefore, the system can group communications according to participants rather than generalized communications that are typically grouped by medium (e.g., traditional email, IM's, or phone calls that are unfiltered). The system can provide each user with a single interface to manage the communications between a select group, and the variety of communications amongst such group. The user can modify a group easily by adding users to an existing group or creating a new group. In some embodiments, adding a user to an existing group may not necessarily incorporate that user into the group because each group may be defined by the last addressed communication. For example, in some embodiments, a new user may not actually be incorporated into a group until another user initiates a communication to the group that includes the new user's address.

In some embodiments, groups for which no communications have been sent for a predetermined period of time may be deactivated for efficiency purposes. For example, the deactivated groups can be purged or stored for later access. By decreasing the number of active groups, the system may avoid overloading its capacity.

The system can provide for the possibility that a communication and its participants can be merged together to form a single subgroup or group. In some embodiments, subgroups can be merged to form a single subgroup or group. For example, two subgroups can be merged to form one large subgroup, still distinct from and contained within the broader group. In another example, two subgroups can be merged to form a new group that is totally separate from the original group. In some embodiments, groups be merged together to form a new group. For example, two groups can be merged together to form a new, larger group that includes all of the subgroups of the original group.

In another embodiment, a user can specify an option that allows other users to view his communications. For example, a user can enable other users in a particular group to view his video, audio or text communications.

In some embodiments, users not included in a particular group or subgroup may be able to select the group or subgroup and request access (e.g., "knocking"). After a user requests access, the users participating in the group or subgroup may be able to decide whether to grant access to the requesting user. For example, the organizer or administrator of the group or subgroup may decide whether or not to grant access. In another example, all users participating in the group or subgroup may vote to determine whether or not to grant access. If access is granted, the new user may be able to participate in communications amongst the previous users. For example, the new user may be able to initiate public broadcasts or private communications amongst a subset of the users in the group or subgroup. Alternatively, if the group or subgroup had not been designated as private, visitors may enter without requesting to do so.

In some embodiments, it may be advantageous to allow each user to operate as an independent actor that is free to join or form groups and subgroups. For example, a user may join an existing subgroup without requiring approval from the users currently in the subgroup. In another example, a user may form a new subgroup without requiring confirmation from the other users in the new subgroup. In such a manner, the system may provide fluid and dynamic communications amongst the users. In some embodiments, it may be advantageous to allow each user to operate as an independent actor that is free to leave groups and subgroups.

Figure 3:
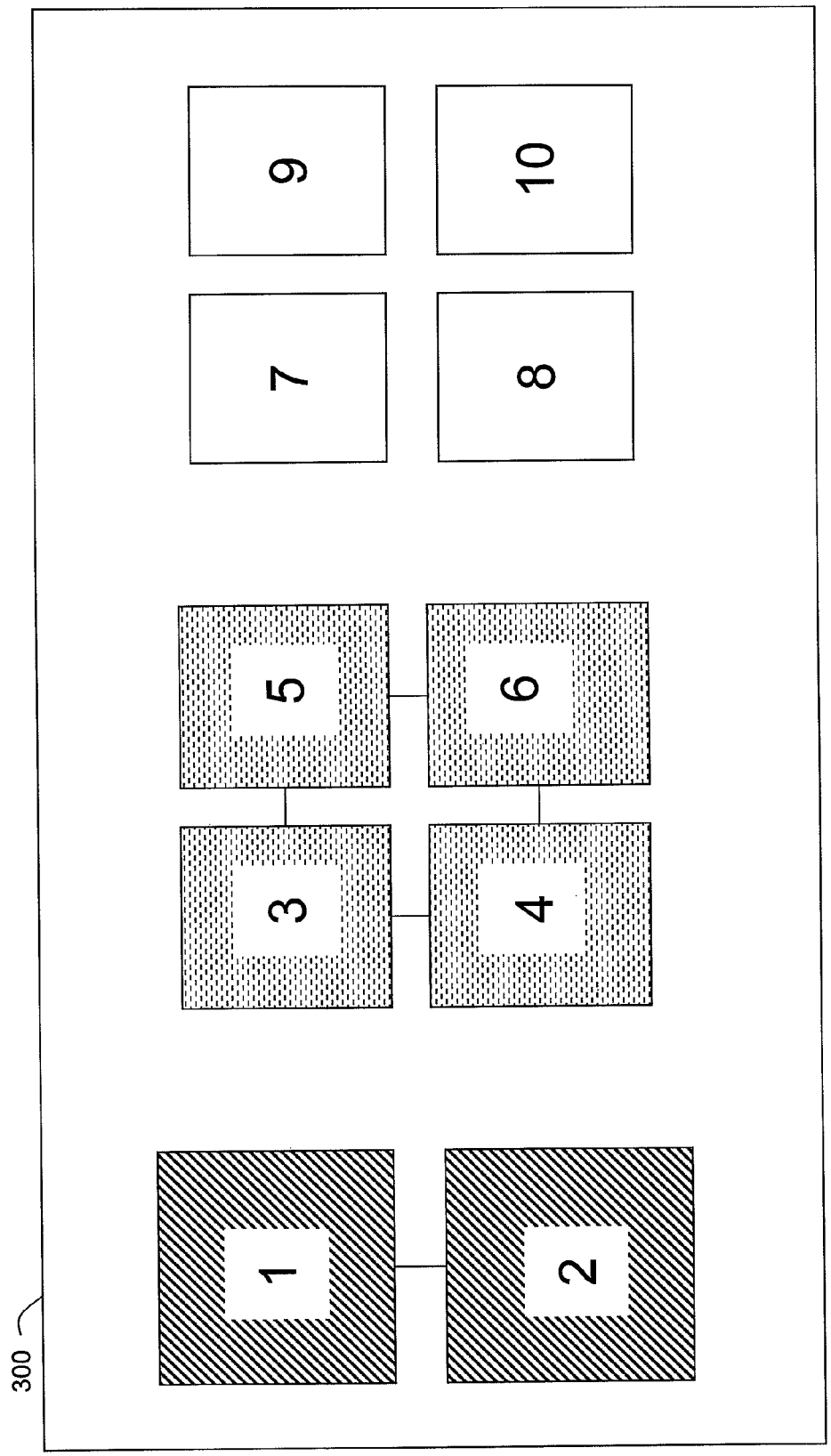
FIG. 3 is a schematic view of an illustrative display screen provided in accordance with one embodiment of the invention.

FIG. 3 is a schematic view of an illustrative display screen provided in accordance with one embodiment of the invention. Screen 300 can be provided by a user device (see, e.g., device 100 shown in FIG. 1 or devices 255-258 shown in FIG. 2). Screen 300 can include various indicators, and each indicator can represent a user on a communications network. In some embodiments, all users on a particular communications network may be represented on a display screen. For example, a communications network may include 10 users, and screen 300 can include at least one indicator per user. In another example, a group within a communications network may include 10 users, and screen 300 can include at least one indicator per user in that group. In other words, screen 300 may only display users in a particular group rather than all users on a communications network. In some embodiments, each indicator can include communications from the corresponding user. For example, each indicator may include video communications from the corresponding user. In some embodiments, an indicator may include video communications at the center of the indicator with a border around the video communications (see, e.g., shaded border around each indicator in FIG. 3). In some embodiments, each indicator may include contextual communications from the corresponding user. For example, an indicator may include robust video communications if the corresponding user is actively communicating. Continuing the example, if the corresponding user is not actively communicating, the indicator may only a still image of the user or a periodically updated image of the user. In some embodiments, at least a portion of each indicator can be altered to represent the corresponding user's current status, including their communications with other users.

Screen 300 may be provided on the device belonging to user 1 and the representations of other users may be based on this vantage point. In some embodiments, users 1-10 may all be members in the same group. In some embodiments, users 1-10 may be the only users on a particular communications network. As previously discussed, each of users 1-10 may be maintained in at least an instant ready-on mode of communication with each other. As seen in screen 300, user 1 and user 2 can be communicating as a subgroup that includes only two users (e.g., a pair). As previously discussed, these two users can be maintained in an active mode of communication. That subgroup may be represented by a line joining the corresponding indicators. Also seen in screen 300, users 3-6 may be communicating as a subgroup. The subgroup may be represented by lines joining the indicators representing the users. In some embodiments, subgroups may be represented by modifying the corresponding indicators to be similar. While the example shown in FIG. 3 uses different shading to denote the visible subgroups, it is understood that colors can also be used to make the corresponding indicators appear similar. It is further understood that a video feed may be provided in each indicator, and that only the border of the indicator may change. In some embodiments, the appearance of the indicator itself may not change at all based on subgroups, but the position of the indicator may vary. For example, the indicators corresponding to user 1 and user 2 may be close together to represent their subgroup while the indicators corresponding to users 3-6 may be clustered together to represent their subgroup. In screen 300, the indicators representing users 7-10 can appear blank. The indicators may appear blank because those users are inactive (e.g., not actively communicating in a pair or subgroup) or because those users have chosen not to publish their communications activities.

Figure 4:
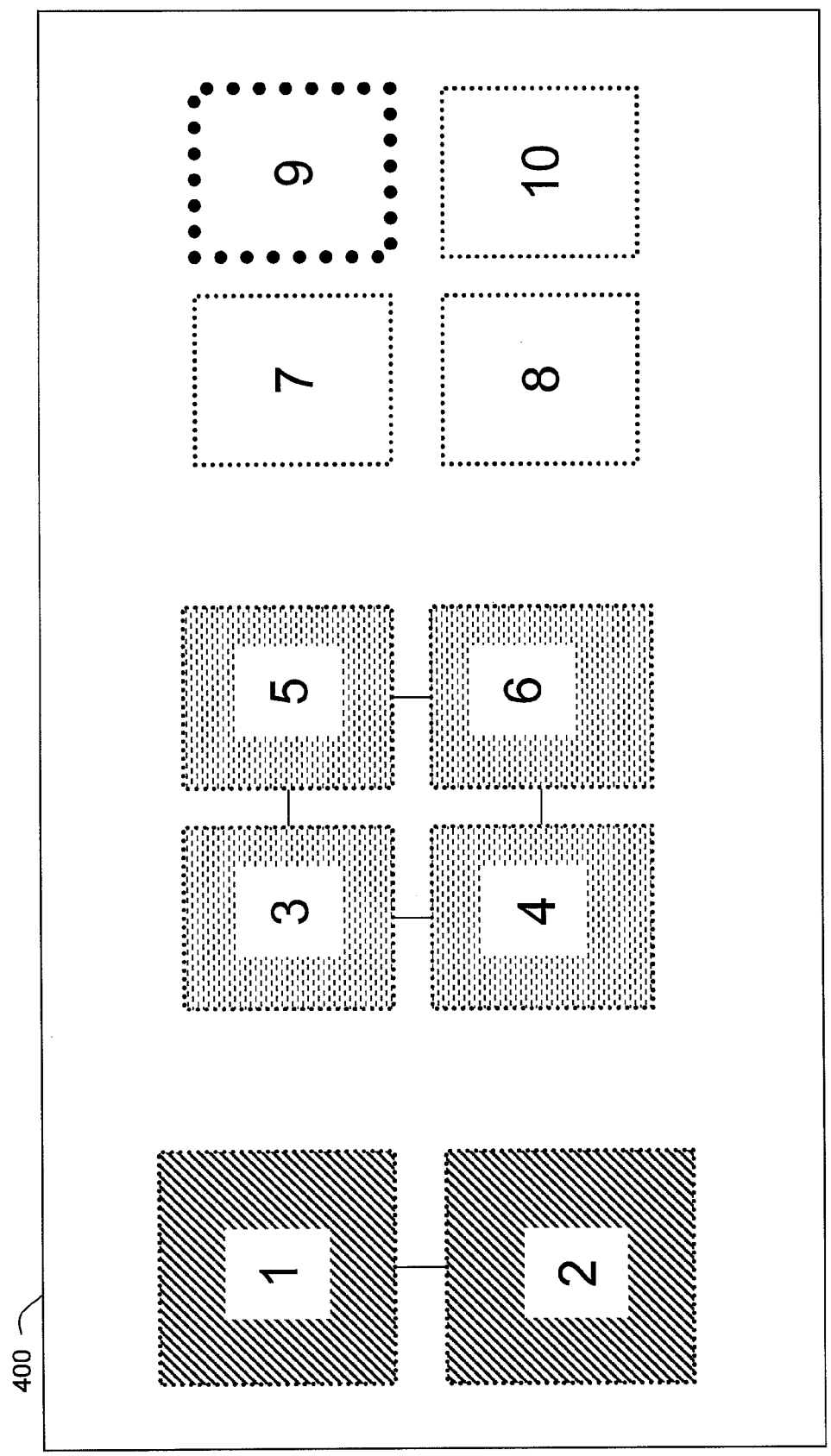
FIG. 4 is a schematic view of an illustrative display screen provided in accordance with one embodiment of the invention.

FIG. 4 is a schematic view of an illustrative display screen provided in accordance with one embodiment of the invention. Screen 400 can be provided by a user device (see, e.g., device 100 shown in FIG. 1 or devices 255-258 shown in FIG. 2). Screen 400 is substantially similar to screen 300 and can include indicators representing users 1-10. Like screen 300, screen 400 can represent subgroups (e.g., users 1 and 2 and users 3-6). Moreover, screen 400 can represent when a user is broadcasting to the entire group. For example, the indicator corresponding to user 9 can be modified to have a bold dotted border around the edge of the indicator to represent that user 9 is broadcasting to the group. In such an example, the mode of communication between user 9 and each other user shown on screen 300 may be upgraded to an active mode so that users 1-8 and user 10 can receive the full broadcast. The indicator corresponding to each user in the group receiving the broadcast communication can also be modified to represent that user's status. For example, the indicators representing users 1-8 and 10 can be modified to have a thin dotted border around the edge of the indicators to represent that they are receiving a group communication from user 9. While the embodiment shown in FIG. 4 includes indicator borders around the edge of each indicator, it is understood that the appearance of indicators can be modified in any suitable manner to convey that a user is broadcasting to the whole group. For example, the location of the indicators may be rearranged so that the indicator corresponding to user 9 is in a more prominent location. In another example, the size of the indicators may be changed so that the indicator corresponding to user 9 is larger than the other indicators.

Figure 5:
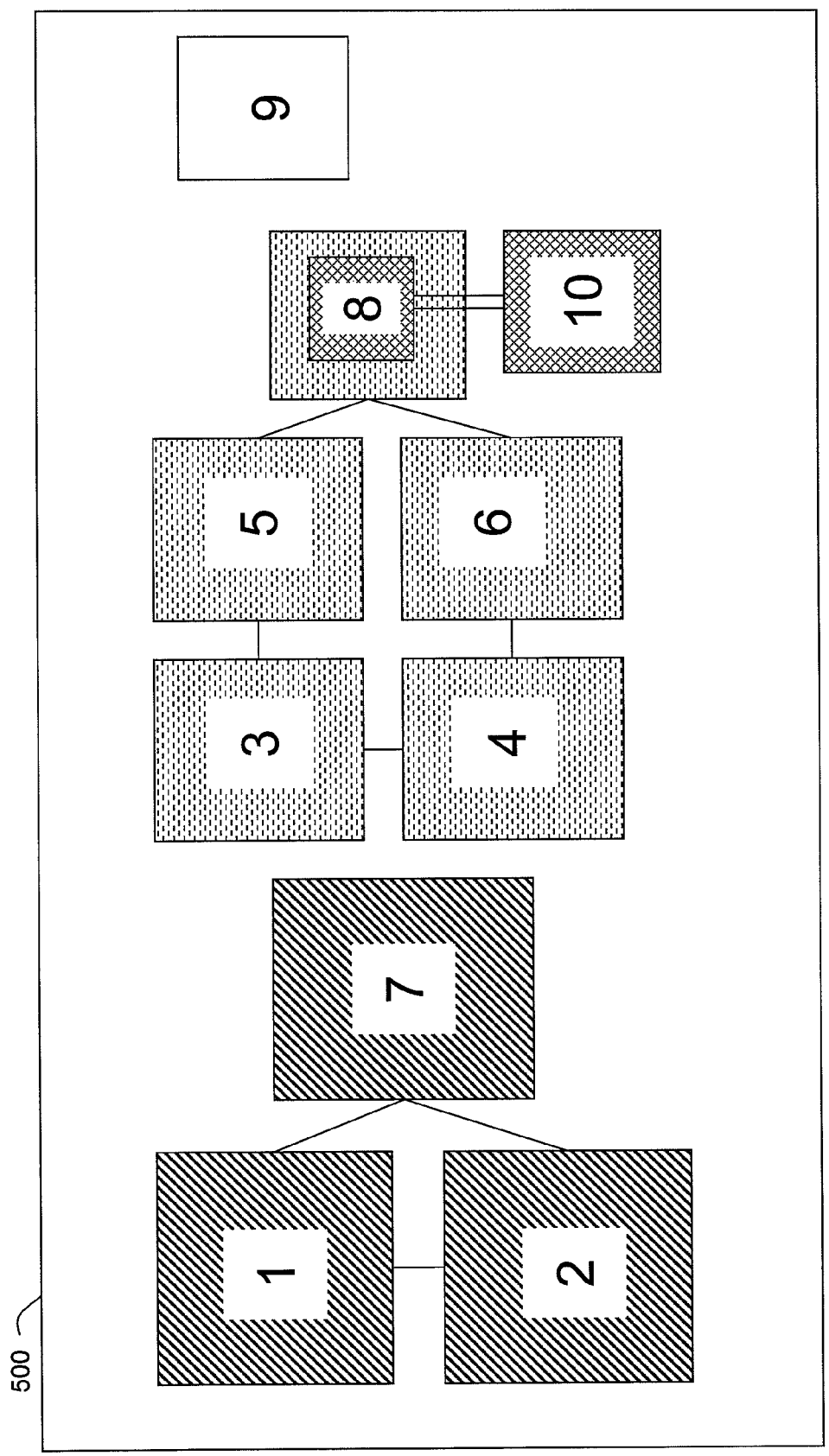
FIG. 5 is a schematic view of an illustrative display screen provided in accordance with one embodiment of the invention.

FIG. 5 is a schematic view of an illustrative display screen provided in accordance with one embodiment of the invention. Screen 500 can be provided by a user device (see, e.g., device 100 shown in FIG. 1 or devices 255-258 shown in FIG. 2). Screen 500 is substantially similar to screen 300 and can include indicators representing users 1-10. In screen 500, user 7 has joined the subgroup of user 1 and user 2. Accordingly, the indicator representing user 7 has changed appearance and is now adjacent to the indicators representing user 1 and user 2, and all three indicators are connected via lines. User 8 has joined the subgroup of users 3-6, and the change may be represented by the addition of a line connector the indicator representing user 8 with the indicators representing users 5 and 6. User 8 and user 10 have formed a pair and are communicating with each other. This pair can be represented by a line connecting user 8 and 10 as well as a change in the appearance of the indicator representing user 10 and at least a portion of the indicator representing user 8. Moreover, the type of communications occurring between user 8 and user 10 may be conveyed by the type of line coupling them. For example, a double line is shown in screen 500 and may represent a private conversation (e.g., user 1 cannot join the communication even though it is displayed). While FIG. 5 may show a private conversation between user 8 and user 10, it is understood that, in some embodiments, the existence of private conversations may not even be visible to users outside the private conversation.

Figure 6:
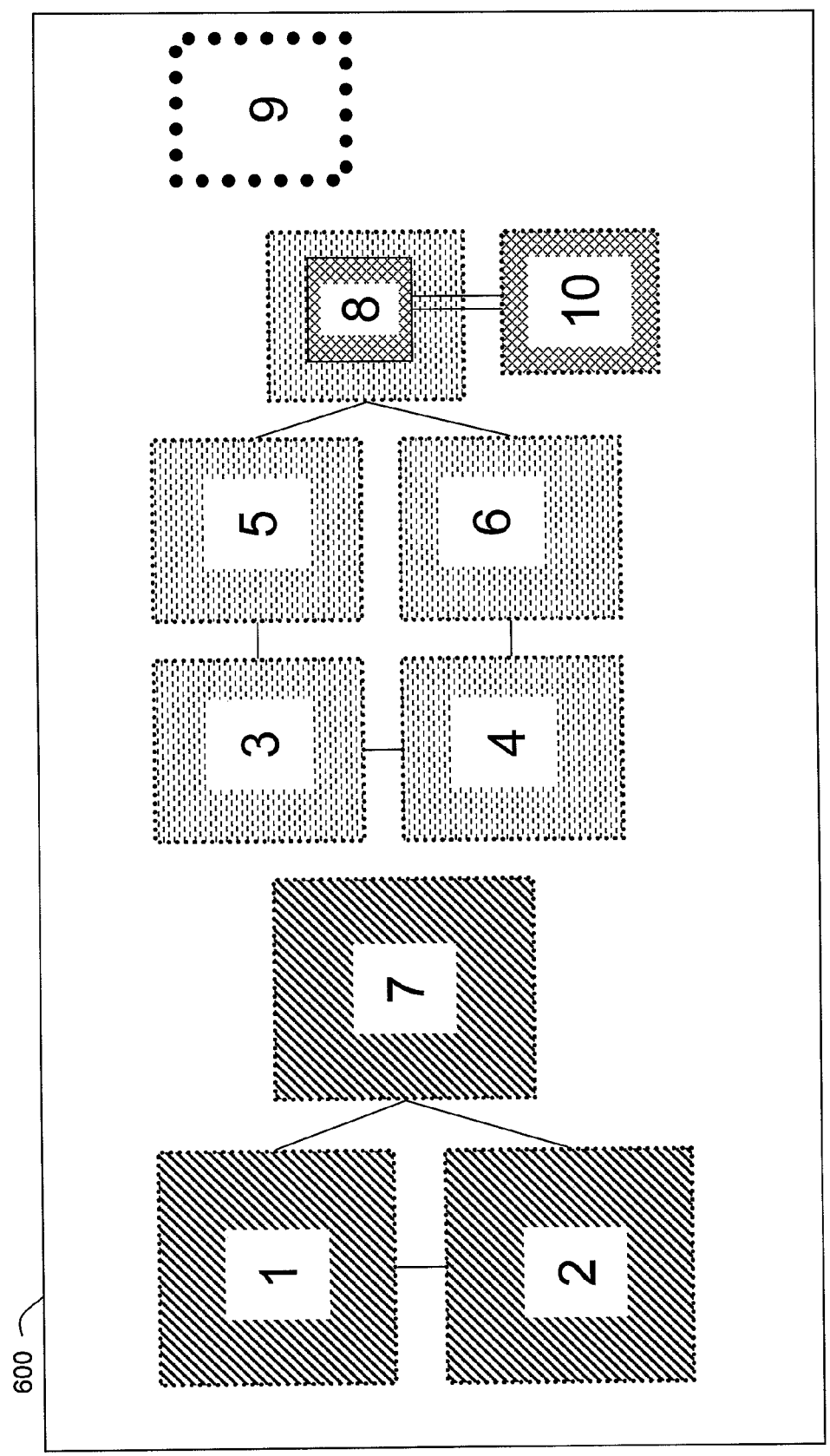
FIG. 6 is a schematic view of an illustrative display screen provided in accordance with one embodiment of the invention.

FIG. 6 is a schematic view of an illustrative display screen provided in accordance with one embodiment of the invention. Screen 600 can be provided by a user device (see, e.g., device 100 shown in FIG. 1 or devices 255-258 shown in FIG. 2). Screen 600 is substantially similar to screen 300 and can include indicators representing users 1-10. Moreover, screen 600 is similar to the status of each user shown in screen 500. For example, screen 600 may represent subgroups (e.g., users 8 and 10; users 1, 2 and 7; and users 3-6 and 8). Moreover, screen 600 can represent when a user is broadcasting to the entire group of interconnected users. In such a situation, regardless of each user's mode of communication with other users, each user may have an active mode of communication with the broadcasting user so that each user can receive the broadcast. In some embodiments, the user indicators can be adjusted to represent group-wide broadcasts. For example, the indicator corresponding to user 9 can be modified to have a bold dotted border around the edge of the indicator which represents that user 9 is broadcasting to the group. The indicator corresponding to each user in the group receiving the broadcast communication can also be modified to represent that user's status. For example, the indicators representing users 1-8 and 10 can be modified to have a thin dotted border around the edge of the indicator to represent that they are receiving a group communication from user 9. While the embodiment shown in FIG. 6 includes indicator borders around the edge of each indicator, it is understood that the appearance of indicators can be modified in any suitable manner to convey that a user is broadcasting to the whole group. For example, the location of the indicators may be rearranged so that the indicator corresponding to user 9 is in a more prominent location. In another example, the size of the indicators may be changed so that the indicator corresponding to user 9 is larger than the other indicators.

While the embodiments shown in FIGS. 3-6 show exemplary methods for conveying the communication interactions between users, it is understood that any suitable technique can be used to convey the communication interactions between users. For example, the communication interactions between users can be conveyed by changing the size of each user's indicator, the relative location of each user's indicator, any other suitable technique or any combination thereof.

Figure 7:
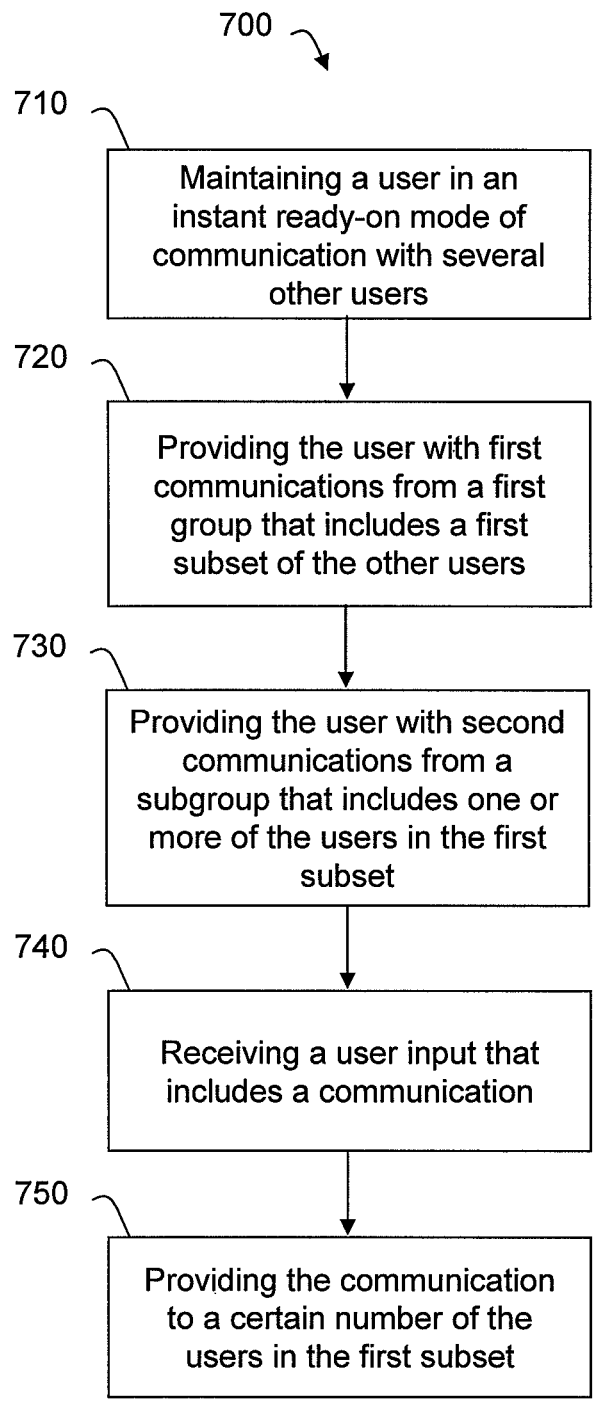
FIGS. 7-20 are flowcharts of illustrative processes for facilitating communications in accordance with various embodiment of the invention.

As previously discussed, dynamic communications amongst multiple users can be provided. FIG. 7 is a flowchart of illustrative process 700 for facilitating communications in accordance with one embodiment of the invention. Process 700 can be performed by a communication system (e.g., system 200 shown in FIG. 2). In some embodiments, process 700 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 700 can be performed by multiple user devices (e.g., multiple instances of device 100) communicating in an ad-hoc network without a server (e.g., communicating through a peer-to-peer network). Process 700 can begin with block 710.

At block 710, a user is maintained in an instant ready-on mode of communication with several other users. In some embodiments, a user may be maintained in an instant ready-on mode of communication with all other users connected to a network. As previously discussed, when in an instant ready-on mode with other users, the user's device may be connected to all other devices but not actively communicating with all of them. The instant ready-on mode of communication can enable the user to initiate a communication with one of the other users without creating a new communication link. The user's individual user device (see, e.g., device 100 shown in FIG. 1 or one of devices 255-258 shown in FIG. 2), a communication server (see, e.g., communications server 250 shown in FIG. 2), or any combination thereof can maintain the user's device in the instant ready-on mode of communication at block 710.

To fully appreciate the advantage of an instant ready-on mode, consider an example where each communication link is represented as a string with a can on each end of the string. In this example, each communication link can be used to communicate between the two ends of the string. In such an example, a user in an instant ready-on mode of communication with every other user in the system has a string communication link with each user in the system. In other words, the user is holding many cans, each can corresponding to a pre-established communication link to another user. Using the instant ready-on mode of communication, the user may be able to instantly initiate a communication with any other user in the network. For example, using a pre-existing communication link to initiate a communication may avoid any delays associated with opening a new communication link. In some embodiments, a system may even initiate a communication without prompting the involved users to confirm the communication.

In some embodiments, maintaining an instant ready-on mode of communication can include persistently transmitting a minimum amount of information amongst users. For example, rather than periodic updates of each user's status, the instant ready-on mode of communication allows for continuous updates of basic information about the user, including the user's current condition. As used herein, the term "presence information" refers to such continuous updates of basic information about the user. Presence information can include any information about a user's availability that is persistently and constantly communicated to other users. Presence information differs from the "status" information provided in traditional systems because such "status" information indicates a user's past choice or setting and does not indicate the user's current state at this moment. For example, in traditional communication networks, if a user specifies that she is busy, the user's "status" will reflect that they are unavailable. In another example, in traditional communication networks, if a user logs out of the network, the user's "status" will not instantly reflect their departure. For example, presence information can include the user's name, network address (e.g., IP address), the user current subgroup(s) and/or group(s), the user's current communication modes, or any combination thereof.

At block 720, the user is provided with first communications from a first group of users. The first group of users can include a first subset of the other users. For example, the first group can include a first subset of all the users in a communications network. In this manner, the user can be provided with visual information related to communications amongst the first group of users, even if the user is not in an active mode of communication with those users. For example, the user can be provided with visual information that suggests the nature of communications within the first group and the reactions (e.g., vocal reactions or facial expressions) of users during those communications. Such visual information can be an important ingredient to social activity and can provide clues to an onlooker deciding whether or not to join a conversation (e.g., a communication). The communications provided at block 720 can include text, audio, video or any suitable combination thereof. The user's individual user device (see, e.g., device 100 shown in FIG. 1 or one of devices 255-258 shown in FIG. 2), a communication server (see, e.g., communications server 250 shown in FIG. 2), or any combination thereof can provide the first communications at block 720.

In some embodiments, the user may be maintained in an intermediate mode of communication with the users in the first group. For example, the communications provided at block 720 may be communications of a degraded quality that are provided in an intermediate mode of communication. Continuing the example, communications provided from the first group may include any suitable communications of a degraded quality (e.g., periodically updated images of the users in the first group). In some embodiments, the user may be maintained in an active mode of communication with the users in the first group. For example, the communications provided from the first group may be provided in an active mode of communication and may include robust audio communications (e.g., high-quality audio communications) or robust video communications (e.g., high-resolution, color video communications at a standard refresh rate).

At block 730, the user is provided with second communications from a subgroup that includes one or more of the users in the first subset. For example, the user and one or more users from the first group can form a subgroup within the group for communicating. Such a subgroup may be public or private. The second communications, which correspond to the subgroup of users, can be provided concurrently with the first communications, which correspond to the larger group of users. The user's individual user device (see, e.g., device 100 shown in FIG. 1 or one of devices 255-258 shown in FIG. 2), a communication server (see, e.g., communications server 250 shown in FIG. 2), or any combination thereof can provide the second communications at block 730.

In some embodiments, the user may be maintained in an active mode of communication with the users in the subgroup. For example, the communications provided from the subgroup may be provided in an active mode of communication and may include robust audio communications (e.g., high-quality audio communications) or robust video communications (e.g., high-resolution, color video communications at a standard refresh rate).

At block 740, a user input that include a communication is received. The user input can include text communication, audio communication, video communication or a communication that includes any combination thereof. The user input can include a communication directed at one or more of the other users. In some embodiments, the user input can specify an output level for the communication (e.g., which of the other users should receive the communication). For example, the communication may be an audio and/or video communication and the user may say another user's name before the communication to specify that the communication be sent to the other user. In some embodiments, the user may provide a separate user input to specify an output level for the communication. For example, the user may provide an input through a separate input interface (see, e.g., input interface 105 shown in FIG. 1) to specify an output level for the communication. The user's individual user device (see, e.g., device 100 shown in FIG. 1 or one of devices 255-258 shown in FIG. 2) can receive the user input at block 740.

At block 750, the communication included in the user input received at block 740 can be provided to a certain number of the other users. For example, the communication received at block 740 can be provided to a number of the other users based on the user's mode or an output level specified in the user's input.

In some embodiments, the user's mode can determine which of the other users are provided with the communication received at block 740. For example, a user may be communicating in a small subgroup and the communication received at block 740 may only be provided to those users with which the user is in an active mode of communication. In another example, the user may have enabled an announcer or broadcast mode so that the user is in an active mode of communication with all of the other users in a group or potentially all of the other users in the network. Continuing the example, once the mode of communications between all of these users has been upgraded to an active mode, the communication received at block 740 can be provided to each user.

In some embodiments, an output level specified in the user input received at block 740 can determine which of the other users are provided with the communication received at block 740. For example, if the user specifies a low output level, the communication received at block 740 may be provided to a small subset of the other users. In another example, if the user specifies a high output level, the communication received at block 740 may be provided to all of the other users in the group or potentially all of the other users in the network. In other words, a user can maintain an active mode of communication with one or more other users for a single communication by specifying an output level for that communication.

A user can specify an output level using any suitable technique. In some embodiments, the user can speak or select (e.g., using a pointing device or a button) a specific output level command to specify an output level. In some embodiments, the user can speak at a particular volume to specify an output level. For example, the user can speak loudly to specify a high output level and a user can speak softly to specify a low output level.

Figure 8:
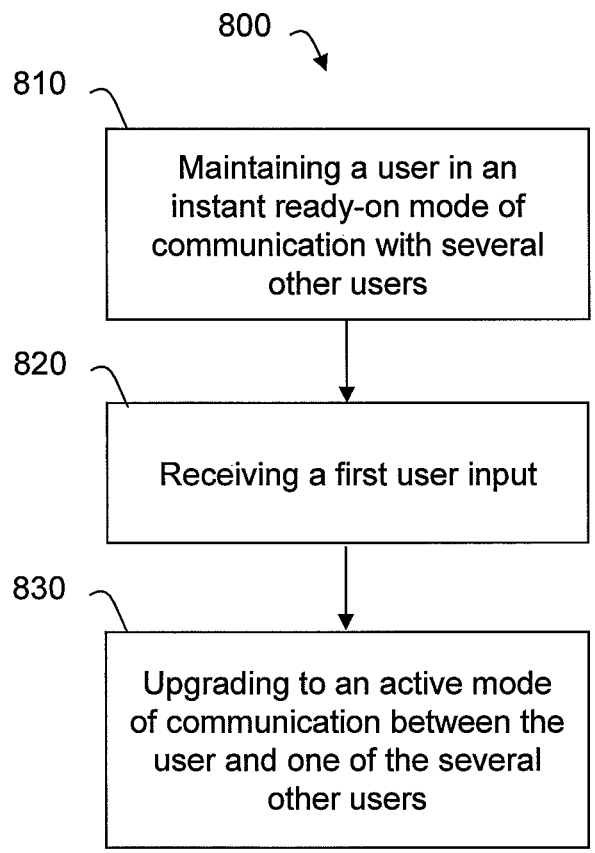

As previously discussed, an instant ready-on mode of communication can enable a user to easily initiate new communications with other users. In some embodiments, a user in an instant ready-on mode of communication with other users may be able to instantly initiate a new communication with the users. FIG. 8 is a flowchart of illustrative process 800 for facilitating communications in accordance with one embodiment of the invention. Process 800 can be performed by a communication system (e.g., system 200 shown in FIG. 2). In some embodiments, process 800 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 800 can be performed by multiple user devices (e.g., multiple instances of device 100) communicating in an ad-hoc network without a server (e.g., communicating through a peer-to-peer network). Process 800 can begin with block 810.

At block 810, a user is maintained in an instant ready-on mode of communication with several other users. Block 810 is substantially similar to block 710 of process 700 and the previous description of the latter can be applied to the former. Moreover, the previously discussed advantages of the instant ready-on mode of communication are also applicable in process 800.

At block 820, a first user input is received. For example, a user can provide an input to initiate a new communication with one or more other users. In some embodiments, a user input may specify which other user or users to initiate a communication with. For example, the user input may specify one or more users to form a new subgroup. In another example, the user input may specify an existing subgroup or subgroup. In some embodiments, a user input may include a communication for transmission to one or more other users. In addition to a communication for transmission, a user input may also include an output level for the communication in some embodiments. The user's individual user device (see, e.g., device 100 shown in FIG. 1 or one of devices 255-258 shown in FIG. 2) can receive the user input at block 820.

At block 830, the mode of communication between the user and one of the other users is upgraded to an active mode of communication. For example, the user input may specify one or more users and then the mode of communication between the user's device and the devices of the one or more specified users may be upgraded to an active mode of communication. In some embodiments, the mode of communication may be upgraded to the active mode instantly after receiving the user input at block 820. In some embodiments, the mode of communication may be upgraded to the active mode without requiring a confirmation from the other user. The user's individual user device (see, e.g., device 100 shown in FIG. 1 or one of devices 255-258 shown in FIG. 2), the other user's device, a communication server (see, e.g., communications server 251 shown in FIG. 2), or any combination thereof can upgrade the mode of communication to the active mode at block 830.

After the upgrade to the active mode of communication is performed at block 830, the user can freely communicate with the other user. The user can communicate with the other user using any suitable medium. For example, the user can communicate with the other user through text, audio, video or any combination thereof. In some embodiments, the active mode of communication can enable the user to communicate with the other user through robust video communications. For example, the active mode of communication can enable the user to communicate with the other user through color, high-resolution video communications.

Figure 9:
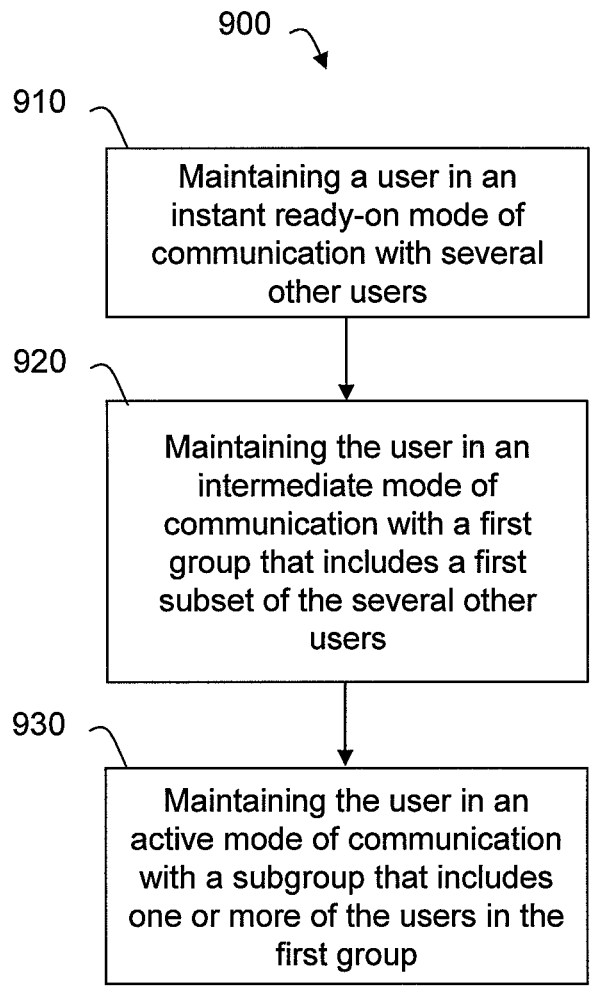

As previously discussed, a user can be maintained in multiple modes of communication with different users. For example, a user can be maintained in an instant-ready on mode of communication with the all other users in a network, the user can be maintained in an intermediate mode of communication with other users in the same group as the user, and the user can be maintained in an active mode of communication with other users in a subgroup with the user. Moreover, a user can fluidly change the communication mode applied between the user and another user. FIG. 9 is a flowchart of illustrative process 900 for facilitating communications in accordance with one embodiment of the invention. Process 900 can be performed by a communication system (e.g., system 200 shown in FIG. 2). In some embodiments, process 900 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 900 can be performed by multiple user devices (e.g., multiple instances of device 100) communicating in an ad-hoc network without a server (e.g., communicating through a peer-to-peer network). Process 900 can begin with block 910.

At block 910, a user is maintained in an instant ready-on mode of communication with several other users. Block 910 is substantially similar to block 710 of process 700 and the previous description of the latter can be applied to the former. Moreover, the previously discussed advantages of the instant ready-on mode of communication are also applicable in process 900.

At block 920, the user is maintained in an intermediate mode of communication with a first group. The first group can include the first subset of the other users. As previously discussed, when in an intermediate mode of communication with other users, the user may be receiving contextual communications from the other users. As described herein, the intermediate mode of communication may differ from the instant ready-on mode of communication because the instant ready-on mode of communication may only provide minimal information from another user (e.g., presence information) while the intermediate mode of communication can provide a flexible range of communication from another user that is variable and may be based on one or more optimization protocols. In some embodiments, the intermediate mode of communication may enable the user to receive intermittent video from the other users. For example, the user may receive video of a lower refresh rate than the standard refresh rate. In some embodiments, the user may receive video of a refresh rate of about 8 Hz, 4 Hz, 2 Hz, 1.33 Hz, 1 Hz, 0.5 Hz, 0.333 Hz, 0.2 Hz, 0.1 Hz, 0.0667 Hz, 0.05 Hz, 0.0333 Hz, 0.0222 Hz, 0.01667 Hz or any other suitable refresh rate. In another example, the user may receive short clips of video at a standard refresh rate, but the short clips may be separated by periods of inactivity. In some embodiments, the intermediate mode of communication may enable the user to receive periodically updated images from the other users. For example, the user may receive images from the other users that are updated every 125 milliseconds, every 250 milliseconds, every 500 milliseconds, every 750 milliseconds, every 1 second, every 2 seconds, every 3 seconds, every 5 seconds, every 10 seconds, every 15 seconds, every 20 seconds, every 30 seconds, every 45 seconds, every 1 minute or any other suitable interval. It is noted that the previously provided refresh rates are merely exemplary, and any suitable refresh rate can be used to provide periodically updated images from the other users. In some embodiments, the intermediate mode of communication may enable the user to receive low-resolution video communications from the other users. In some embodiments, the intermediate mode of communication may enable the user to receive grayscale video communications from the other users. In general, the intermediate mode of communication may enable the user to receive communications that are of a less than ideal quality because the user is not actively communicating with the other users. The user's individual user device (see, e.g., device 100 shown in FIG. 1 or one of devices 255-258 shown in FIG. 2), the other users' individual user devices, a communication server (see, e.g., communications server 251 shown in FIG. 2), or any combination thereof can maintain the user's device in the intermediate mode of communication at block 920.

In some embodiments, a user can provide a user input specifying a scan operation. In response to such a user input, the user may be provided with visualizations of other users beyond those in a particular group (e.g., other users on the system that are not in the same group as the user). For example, the user may be provided with still images, intermittent video, or periodically updated images of the users. In this manner, the user can visualize other users in a group without necessarily joining the group. For example, the user may establish a temporary intermediate mode of communication with the users in the group to obtain the users' visualizations and then return to an instant ready-on mode of communication with those users.

In some embodiments, each group of users may correspond to a virtual room. For example, the user can be maintained in an intermediate mode of communication with all of the users in a virtual room. While described as a virtual "room" such a term does not imply a spatial significance. Accordingly, indicators representing the users can move around the screen in an arbitrary manner that does not attempt to replicate the spatial layout of the room. Moreover, the previously discussed scan operation can be applied to rooms so that a user can be provided with visualizations of the other users in a room without necessarily joining the room.

In some embodiments, the user can provide a user input specifying a move operation. The user input may specify a target group or room. In response to such an input, the user may join the specified group or room. For example, the mode of communication between the user and the users in the specified group or room may be upgraded to the intermediate mode of communication. In some embodiments, as part of the move operation, the user may be withdrawn from any group or room of which she was a member at the time of the user input (e.g., moving from one group or room to the next). For example, the user may be downgraded to an instant ready-on mode of communication with respect to the members of the old group.

In some embodiments, the user can provide a user input specifying a move operation. In response to such an input, the user may join or form a new group or room of users. For example, the shuffle operation can place a user in a random group or room of other users. In some embodiments, the shuffle operation can withdraw the user from any group or room of which she was a member at the time of the user input.

At block 930, the user is maintained in an active mode of communication with a subgroup. The subgroup can include one or more of the users in the first group. The user may be maintained in an active mode of communication with one or more users in the subgroup so that the user can communicate with the one or more users in the subgroup. The active mode of communication can enable the user to communicate with the one or more users in the subgroup through robust video communications. For example, the active mode of communication can enable the user to communicate with the one or more users in the subgroup through high-resolution, color video communications at a standard refresh rate. The user's individual user device (see, e.g., device 100 shown in FIG. 1 or one of devices 255-258 shown in FIG. 2), the other user's device, a communication server (see, e.g., communications server 251 shown in FIG. 2), or any combination thereof can maintain the user's device in the intermediate mode of communication at block 930.

In some embodiments, block 910, block 920 and block 930 can occur concurrently. For example, the user can be concurrently maintained in an instant ready-on mode of communication with several other users, in an intermediate mode of communication with a first group of the other users and in an active mode of communication with a subgroup of the first group.

In some embodiments, maintaining the user in an instant ready-on mode of communications with the other users may enable the user to function as an independent actor in the communications network. For example, the user can independently form groups and subgroups with any of the plurality of other users that are in the instant ready-on mode of communication with the user. As a specific illustrative example, if a user wishes to form a subgroup with a second user, the mode of communication between the user and the second user can be seamlessly converted from the instant ready-on mode to an active mode. Moreover, because the user is an independent actor in the communications network, the user can independently leave groups and subgroups. For example, the user can leave a group or subgroup while the group or subgroup continues communications. This can be advantageous because the user can fluidly jump from one group or subgroup to another group or subgroup without disrupting the other users.

In accordance with some embodiments, a system can manage simultaneous (e.g., conflicting) communications. For example, a system can manage simultaneous communications to minimize confusion and balance the priorities of different communications so that a user can perform fluid conversations with multiple groups or subgroups of users. Priority of a communication can be based on one or more various factors. In some embodiments, a communication's priority may be based on the mode of communication in which it was received. For example, a communication received in an intermediate mode may have a lower priority than a communication received in an active mode. In some embodiments, a communication's priority may be specified by the transmitting user. In some embodiments, a communication's priority may be a function of the transmitting user's identity. For example, communications from a user's family members may be given priority over communications from a user's friends. In some embodiments, a communication's priority may be inversely proportional to its length so that shorter communications have a higher priority and are more likely to interrupt previous communications. The length of audio and video communications may be determined by identifying a period in which the transmitting user stops speaking or moving for a predetermined amount of time, and the length of text communications may be determined by identifying a period in which the transmitting user stops typing for a predetermined amount of time.

In accordance with some embodiments, the system can manage the user's communications so that the user experience is as proximate to real-time communications at all times, but without overloading the user's capacity to receive communications. Intuitive default settings can be provided to anticipate the most likely user preferences. For example, a system can balance new communications received by a user with communications that the user is already receiving or communications to which the user is already responding. In some embodiments, the system can be configured, at the user's option, to interrupt either or both activities to give priority to the most recent incoming communication. In some embodiments, the system can be configured to place incoming communications in a cue so that the communications are delayed. In some embodiments, the system can be configured to provide all received communications in real time with adjusted prominence (e.g., by adjusting relative volume or relative visual space). In some embodiments, a user can convert less important communications into an alternative format. For example, when less important audio communications conflict with more important audio communications, the less important audio communications can be provided to a user as text generated by voice recognition software. In another example, when less important text communications conflict with more important text communications, the more important text communications can be provided to a user as audio generated by speech generation software.

In some embodiments, the recipient of an conflicting communication may be provided with an indicator specifying who transmitted the new communication, and may then choose whether the new communication has priority over a pre-existing communication. After a user has provided an input specifying a choice, the less important communication may be recorded such that a user can be provided with that communication at later time. In some embodiments, the user can be provided with any appropriate indicators, such as an indicator representing the sender or one or more indicators representing the other parties that received the communication, when the less important communication is provided at a later time. In some embodiments, the system may also identify all communications amongst a similar group to be a single conversation, and the system may store all such communications in sequence so that they can be displayed in context at a later time.

In some embodiments, simultaneous audio communications can be managed by providing them at differing volume levels with only the primary communication enabled for audio response. In this embodiment, audio inputs that a user provides for the primary communication can be filtered so that other audio from the secondary communications are removed. Accordingly, the audio transmitted to the primary communication can include only the user's intended response. In some embodiments, a mute function can be provided so that a system may automatically silence secondary communications when a user is providing an audio input.

Screen 300 shown in FIG. 3 can provide a context for a discussion of conflicting inputs. As previously discussed, simultaneous (e.g., conflicting) communications can be prioritized. For example, communications that user 1 receives from user 2 may be given high priority because user 1 is in a subgroup with user 2 and, therefore, may be in an active mode of communication. Given that user 1 is not actively communicating with users 3-10, that user may be in an instant ready-on mode of communication with those users and most communications from users 3-10 can be given low priority. However, some communications from users 3-10 may occasionally be given higher priority for various reasons. For example, another user may designate a communication as urgent, and user 1 may give urgent communications higher priority. In some embodiments, the priority of communications sent from other users may be based on options selected by user 1. For example, a communication from another user that user 1 has designated as a relative or friend may be given higher priority than a communication from user 2 even though user 1 and user 2 are paired.

In some embodiments, group-wide communications may be given higher priority than other communications, including communications between subgroups. For example, continuing to the exemplary context of screen 300 shown in FIG. 3, group-wide communications that user 1 receives from user 9 may be given higher priority than communications that user 1 receives from user 2. Such embodiments may be advantageous for effectively disseminating announcements or status updates. In other embodiments, group-wide communications may be given lower priority than other, more personal, communications. For example, group-wide communications that user 1 receives from user 9 may be given lower priority than communications that user 1 receives from user 2. Such embodiments may be advantageous for effectively maintaining coherent one-to-one conversations between users in small subgroups.

Figure 10:
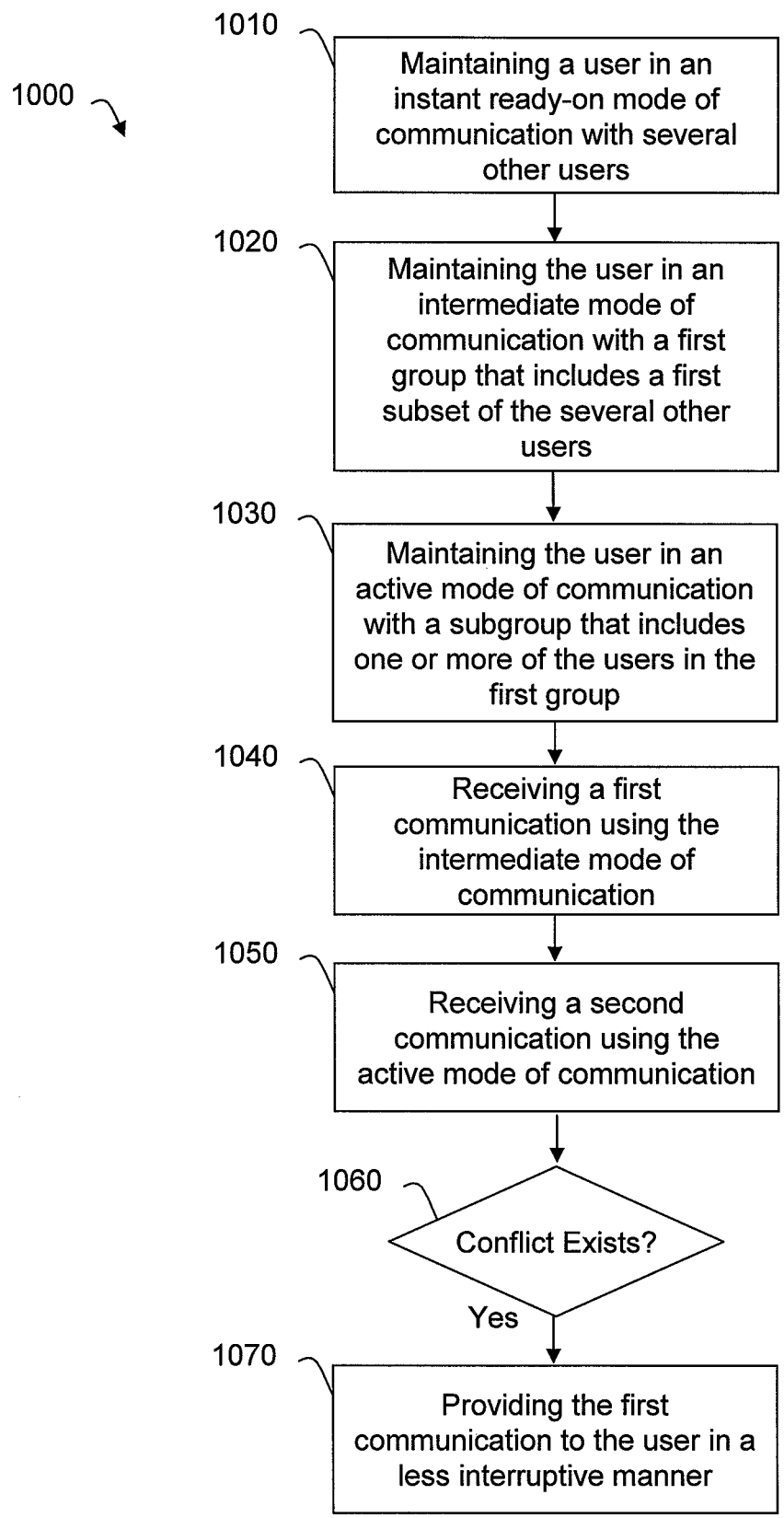

FIG. 10 is a flowchart of illustrative process 1000 for facilitating communications in accordance with one embodiment of the invention. Process 1000 can be performed by a communication system (e.g., system 200 shown in FIG. 2). In some embodiments, process 1000 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1000 can be performed by multiple user devices (e.g., multiple instances of device 100) communicating in an ad-hoc network without a server (e.g., communicating through a peer-to-peer network). Process 1000 can begin with block 1010.

At block 1010, a user is maintained in an instant ready-on mode of communication with several other users. Block 1010 is substantially similar to block 710 of process 700 and the previous description of the latter can be applied to the former. Moreover, the previously discussed advantages of the instant ready-on mode of communication are also applicable in process 1000.

At block 1020, the user is maintained in an intermediate mode of communication with a first group. The first group can include the first subset of the other users. Block 1020 is substantially similar to block 920 of process 900 and the previous description of the latter can be applied to the former.

At block 1030, the user is maintained in an intermediate mode of communication with a subgroup. The subgroup can include one or more of the users in the first group. Block 1030 is substantially similar to block 730 of process 700 and the previous description of the latter can be applied to the former.

At block 1040, a first communication is received using the intermediate mode of communication. For example, the user may receive a communication from one or more of the users in the first group (see, e.g., block 1020). The received communication can be in any suitable medium. For example, communication received at block 1040 may be a video communication. In some embodiments, the received communication can be a contextual communication (e.g., intermittent video or a periodically updated image). The user's individual user device (see, e.g., device 100 shown in FIG. 1 or one of devices 255-258 shown in FIG. 2), a communication server (see, e.g., communications server 251 shown in FIG. 2), or any combination thereof can receive the communication at block 1040.

At block 1050, a first communication is received using the active mode of communication. For example, the user may receive a communication from one or more of the users in the subgroup (see, e.g., block 1030). The received communication can be in any suitable medium. For example, communication received at block 1050 may be a video communication. The user's individual user device (see, e.g., device 100 shown in FIG. 1 or one of devices 255-258 shown in FIG. 2), a communication server (see, e.g., communications server 251 shown in FIG. 2), or any combination thereof can receive the communication at block 1050.

At block 1060, it is determined if a conflict exists. For example, block 1060 can include determining if the communication received at block 1040 conflicts with the communication received at block 1050. Various factors can be considered to determine if communications are conflicting. In some embodiments, the time at which each communication is received or scheduled to be provided to the users can be considered so that any temporally overlapping communications are considered conflicting. In some embodiments, each communication may correspond to a particular group or subgroup and the communications may be considered conflicting if they correspond to the same group or subgroup. Moreover, the previous two embodiments are merely exemplary and it is understood that any factor can be considered to determine if communications are conflicting. For example, any factor that correlates with the chance that the receiving user would be confused or overwhelmed by the communications can be considered to determine if a conflict exists between the communications. The user's individual user device (see, e.g., device 100 shown in FIG. 1 or one of devices 255-258 shown in FIG. 2), a communication server (see, e.g., communications server 251 shown in FIG. 2), or any combination thereof can determine if a conflict exists at block 1060.

If it is determined that a conflict exists, process 1000 can proceed to block 1060. At block 1060, the communication received at block 1040 is provided to the user in a less interruptive manner. In some embodiments, such as the one shown in process 1000, communications received using an intermediate mode of communication may have less priority than communications received using an active mode of communication. In such embodiments, the communication received at block 1040 may have less priority than the communication received at block 1050. Accordingly, in the event of a conflict, the communication received at block 1040 may be provided in a less interruptive manner than the communication received at block 1050. For example, the communication received at block 1040 may be a communication in a video medium and that communication may be converted to a text medium so that it will be less interruptive to the user. The user's individual user device (see, e.g., device 100 shown in FIG. 1 or one of devices 255-258 shown in FIG. 2), a communication server (see, e.g., communications server 251 shown in FIG. 2), or any combination thereof can provide the communication in a less interruptive medium at block 1070.

If it is determined that a conflict does not exist, process 1000 can proceed in any suitable manner. For example, if no conflict exists, each received communication can be provided to the user in accordance with normal operations of the system.

Figure 11:
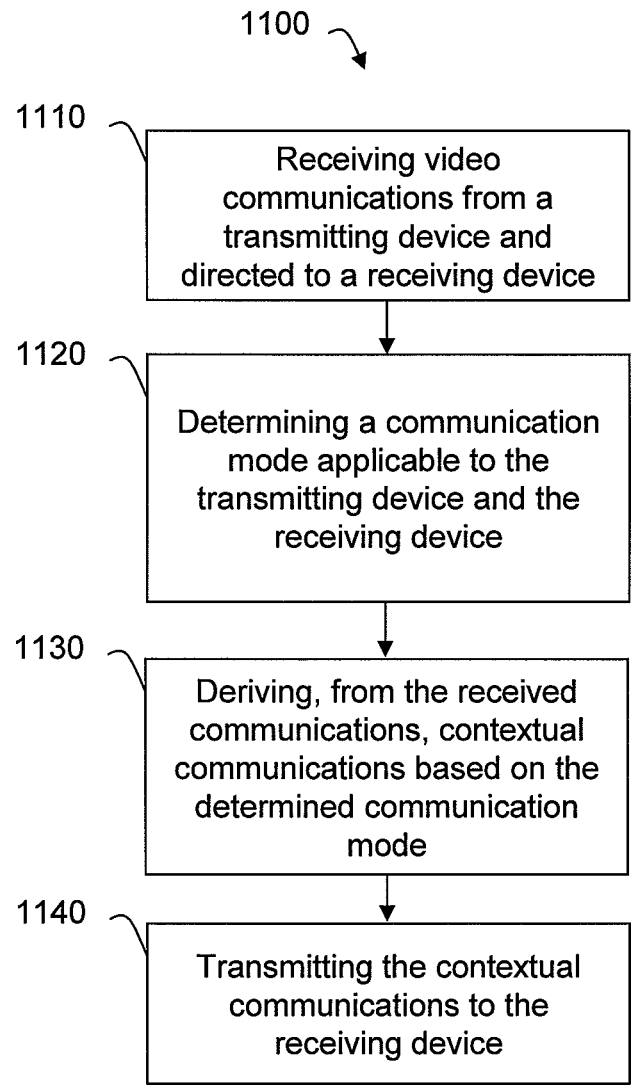

As previously discussed, a communications can be adjusted based on one or more factors. In other words, contextual communications can be derived based on the original communications and the one or more factors. FIG. 11 is a flowchart of illustrative process 1100 for facilitating communications in accordance with one embodiment of the invention. Process 1100 can be performed by a communication system (e.g., system 200 shown in FIG. 2). In some embodiments, process 1100 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1100 can be performed by multiple user devices (e.g., multiple instances of device 100) communicating in an ad-hoc network without a server (e.g., communicating through a peer-to-peer network). Process 1100 can begin with block 1110.

At block 1110, video communications can be received. The video communications can be received from a transmitting device and directed to a receiving device. The received communication can be received through any suitable mode of communication. For example, the communication received at block 1110 can be received through an intermediate mode of communication or an active mode of communication. An individual user device (see, e.g., device 100 shown in FIG. 1 or one of devices 255-258 shown in FIG. 2), a communication server (see, e.g., communications server 251 shown in FIG. 2), or any combination thereof can receive the communications at block 1110.

At block 1120, a communication mode applicable to the transmitting device and the receiving device can be determined. For example, the determined mode of communication can include an instant ready-on mode, an intermediate mode or an active mode. In some embodiments, the applicable mode of communication may be designated by the mode of communication in which the transmitting user and the receiving user are maintained (see, e.g., blocks 910, 920 and 930, each of which is shown in FIG. 9). In some embodiments, the activity between the transmitting device and the receiving device may be considered to determine the applicable mode. In some embodiments, a group or subgroup status of the transmitting device and/or the receiving device may be considered to determine the applicable mode. An individual user device (see, e.g., device 100 shown in FIG. 1 or one of devices 255-258 shown in FIG. 2), a communication server (see, e.g., communications server 251 shown in FIG. 2), or any combination thereof can determine the communication mode at block 1120.

At block 1130, contextual communications can be derived from communications received at block 1110. The contextual communications can be based on the communication mode determined at block 1120. For example, the contextual communications can be derived to include less information than the received communications. The contextual communications can include, for example, an intermittent video or periodically updated image based on the received communications. In some embodiments, the contextual communications can include a low-resolution or grayscale communication based on the received communications. An individual user device (see, e.g., device 100 shown in FIG. 1 or one of devices 255-258 shown in FIG. 2), a communication server (see, e.g., communications server 251 shown in FIG. 2), or any combination thereof can derive the contextual communications at block 1130.

At block 1140, contextual communications derived at block 1130 can be transmitted to the receiving device. In some embodiments, the size of the contextual communications may be smaller than the size of the received communications. In this manner, the system's bandwidth may be used in an optimum manner. An individual user device (see, e.g., device 100 shown in FIG. 1 or one of devices 255-258 shown in FIG. 2), a communication server (see, e.g., communications server 251 shown in FIG. 2), or any combination thereof can transmit the contextual communications at block 1140.

Figure 12:
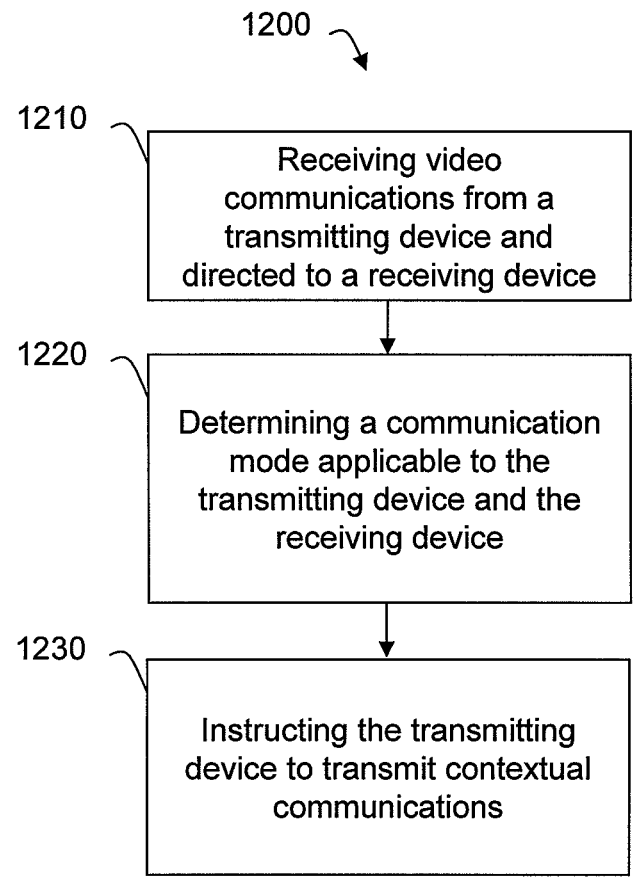

In some embodiments, the transmitting device can be instructed to provide contextual communications. For example, rather than adjusting communications en route, a server or other user device can instruct the transmitting device to transmit contextual communications. FIG. 12 is a flowchart of illustrative process 1200 for facilitating communications in accordance with one embodiment of the invention. Process 1200 can be performed by a communication system (e.g., system 200 shown in FIG. 2). In some embodiments, process 1200 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1200 can be performed by multiple user devices (e.g., multiple instances of device 100) communicating in an ad-hoc network without a server (e.g., communicating through a peer-to-peer network). Process 1200 can begin with block 1210.

At block 1210, video communications can be received. The video communications can be received from a transmitting device and directed to a receiving device. Block 1210 is substantially similar to block 1110 of process 1100 and the previous description of the latter can be applied to the former.

At block 1220, a communication mode applicable to the transmitting device and the receiving device can be determined. Block 1220 is substantially similar to block 1120 of process 1100 and the previous description of the latter can be applied to the former.

At block 1230, the transmitting device can be instructed to transmit contextual communications. The instruction to transmit contextual communications can be based on the communication mode determined at block 1220. For example, the transmitting device can be instructed to transmit intermittent video or periodically updated images. In another example, the transmitting device can be instructed to transmit low-resolution or grayscale video. By instructing the transmitting device to modify its operation, the system can optimize the bandwidth at the receiving device, at the transmitting device, at the server, or any combination thereof. An individual user device (see, e.g., device 100 shown in FIG. 1 or one of devices 255-258 shown in FIG. 2), a communication server (see, e.g., communications server 251 shown in FIG. 2), or any combination thereof can instruct the transmitting device at block 1230.

Figure 13:
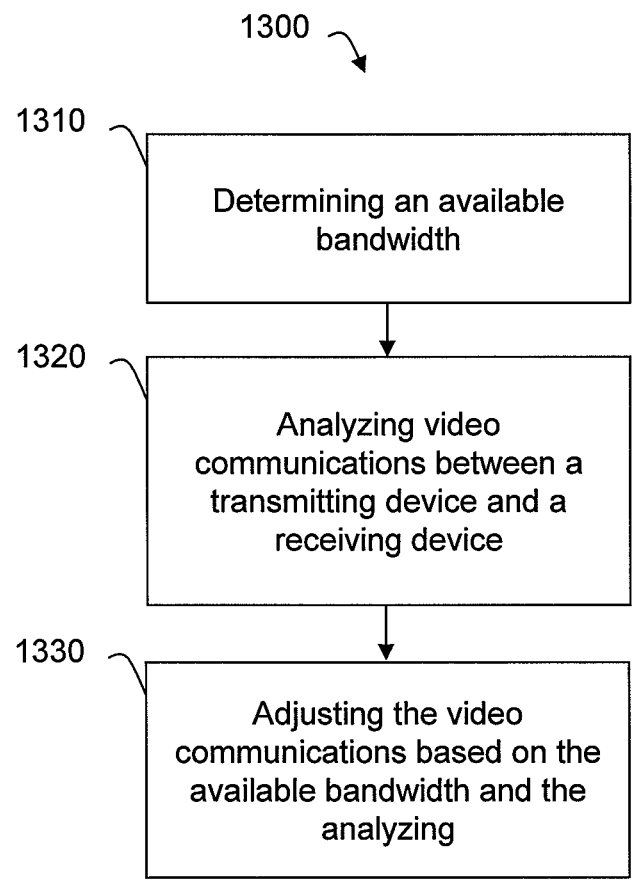

As previously discussed, communications can be adjusted based on available bandwidth. For example, a communications network may determine the available bandwidth between two or more nodes (e.g., between the transmitting device and the server or between the server and the receiving device) and then adjust communications based on the determined bandwidth. In this manner, contextual communications can be provided that are appropriate for the available bandwidth. FIG. 13 is a flowchart of illustrative process 1300 for facilitating communications in accordance with one embodiment of the invention. Process 1300 can be performed by a communication system (e.g., system 200 shown in FIG. 2). In some embodiments, process 1300 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1300 can be performed by multiple user devices (e.g., multiple instances of device 100) communicating in an ad-hoc network without a server (e.g., communicating through a peer-to-peer network). Process 1300 can begin with block 1310.

At block 1310, an available bandwidth can be determined. The available bandwidth can include the unused bandwidth between two or more nodes of the communications network. For example, the available bandwidth can include a transmitting device's available bandwidth (e.g., the unused bandwidth between the transmitting device and the server) or a receiving device's available bandwidth (e.g., the unused bandwidth between the server and the receiving device). In some embodiments, the available bandwidth can include an average measure of unused bandwidth across the entire path between a message origin and destination. In some embodiments, the available bandwidth can be generally categorized as minimal available bandwidth or substantial available bandwidth. In such embodiments, minimal available bandwidth corresponds to an amount of unused bandwidth that is insufficient for live robust video communications while substantial available bandwidth corresponds to enough unused bandwidth for live robust video communications. Moreover, it is understood that the fields of compression and transmission technology are progressing so that the exact amount of bandwidth necessary for robust video communications may change over time. Any suitable technique can be used to determine the available bandwidth. In some embodiments, one or more ping operations may be performed to determine the available bandwidth. In some embodiments, a communications network may receive signals from network components, such as routers, hubs or switches, to determine the available bandwidth. An individual user device (see, e.g., device 100 shown in FIG. 1 or one of devices 255-258 shown in FIG. 2), a communication server (see, e.g., communications server 251 shown in FIG. 2), or any combination thereof can determine the available bandwidth at block 1310.

At block 1320, video communications between a transmitting device and a receiving device are analyzed. Video communications can be analyzed for one or more suitable features. In some embodiments, the communications can be analyzed to determine the size of the communications. For example, the communications can be analyzed to determine their size relative to the available bandwidth. In some embodiments, the communications can be analyzed to determine the applicable communication mode (see, e.g., block 1120 shown in FIG. 11 and related discussion). An individual user device (see, e.g., device 100 shown in FIG. 1 or one of devices 255-258 shown in FIG. 2), a communication server (see, e.g., communications server 251 shown in FIG. 2), or any combination thereof can analyze video communications at block 1310.

At block 1330, the video communications are adjusted. The video communications can be adjusted based on the available bandwidth determined at block 1310 and the analyzing performed at block 1320. For example, in the embodiments where the size of the communications is analyzed, the video communications may be adjusted so that the size of the communications conforms with the available bandwidth. In embodiments where the applicable communication mode is analyzed, the communications may be adjusted so that the communications are appropriate for the context (see, e.g., contextual communications). An individual user device (see, e.g., device 100 shown in FIG. 1 or one of devices 255-258 shown in FIG. 2), a communication server (see, e.g., communications server 251 shown in FIG. 2), or any combination thereof can adjust the video communications at block 1330.

Figure 14:
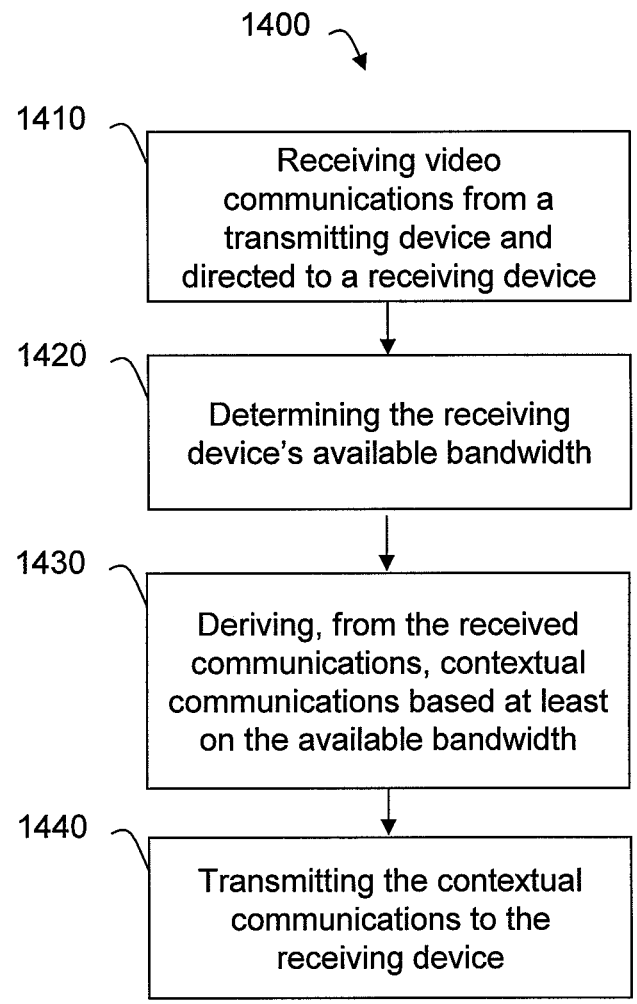

As previously discussed, the receiving device's available bandwidth can be determined and used to optimize video communications. FIG. 14 is a flowchart of illustrative process 1400 for facilitating communications in accordance with one embodiment of the invention. Process 1400 can be performed by a communication system (e.g., system 200 shown in FIG. 2). In some embodiments, process 1400 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1400 can be performed by multiple user devices (e.g., multiple instances of device 100) communicating in an ad-hoc network without a server (e.g., communicating through a peer-to-peer network). Process 1400 can begin with block 1410.

At block 1410, video communications can be received. The video communications can be received from a transmitting device and directed to a receiving device. Block 1410 is substantially similar to block 1110 of process 1100 and the previous description of the latter can be applied to the former.

At block 1420, the receiving device's available bandwidth can be determined. For example, the available bandwidth can include the available bandwidth between the receiving device and a communication server (see, e.g., server 251 shown in FIG. 2). As previously discussed, any suitable technique can be employed to determine available bandwidth. For example, a server could ping the receiving device to determine the available bandwidth between the server and the receiving device. An individual user device (see, e.g., device 100 shown in FIG. 1 or one of devices 255-258 shown in FIG. 2), a communication server (see, e.g., communications server 251 shown in FIG. 2), or any combination thereof can determine the receiving device's available bandwidth at block 1420.

At block 1430, contextual communications can be derived from communications received at block 1410. The contextual communications can be based on the bandwidth determined at block 1420. For example, the contextual communications can be derived to include less information than the received communications. In some embodiments, the contextual communications can be derived to include an amount of information from the received communications that is suitable for the amount of available bandwidth. The contextual communications can include, for example, an intermittent video or periodically updated image based on the received communications. In some embodiments, the contextual communications can include a low-resolution or grayscale communication based on the received communications. An individual user device (see, e.g., device 100 shown in FIG. 1 or one of devices 255-258 shown in FIG. 2), a communication server (see, e.g., communications server 251 shown in FIG. 2), or any combination thereof can derive the contextual communications at block 1130.

At block 1440, the contextual communications can be transmitted to the receiving device. For example, the contextual communications derived at block 1430 can be transmitted to the receiving device. Block 1440 is substantially similar to block 1140 of process 1100 and the previous description of the latter can be applied to the former. However, block 1440 differs in one significant aspect in that the contextual communications transmitted at block 1440 were derived based on the receiving device's available bandwidth.

Figure 15:
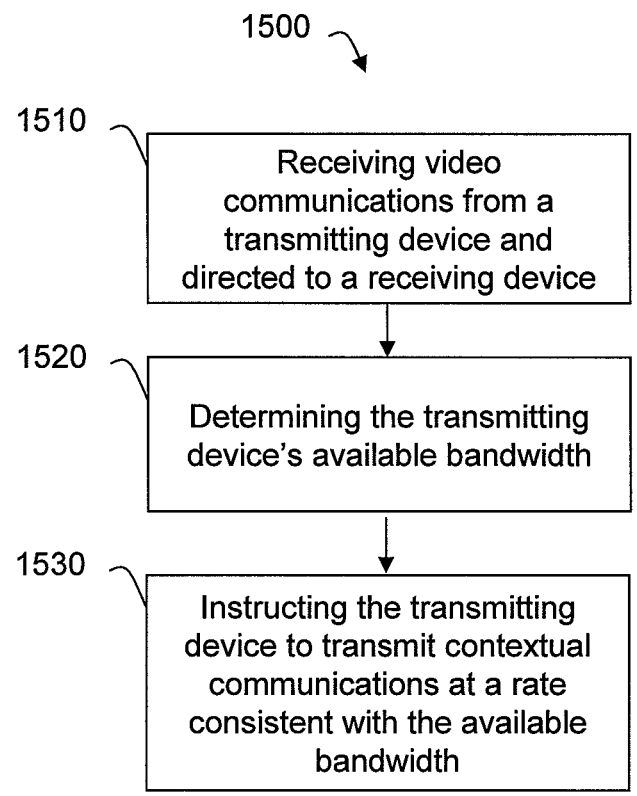

As previously discussed, the transmitting device's available bandwidth can be determined and used to optimize video communications. FIG. 15 is a flowchart of illustrative process 1500 for facilitating communications in accordance with one embodiment of the invention. Process 1500 can be performed by a communication system (e.g., system 200 shown in FIG. 2). In some embodiments, process 1500 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1500 can be performed by multiple user devices (e.g., multiple instances of device 100) communicating in an ad-hoc network without a server (e.g., communicating through a peer-to-peer network). Process 1500 can begin with block 1510.

At block 1510, video communications can be received. The video communications can be received from a transmitting device and directed to a receiving device. Block 1510 is substantially similar to block 1110 of process 1100 and the previous description of the latter can be applied to the former.

At block 1520, the transmitting device's available bandwidth can be determined. For example, the available bandwidth can include the available bandwidth between the transmitting device and a communication server (see, e.g., server 251 shown in FIG. 2). As previously discussed, any suitable technique can be employed to determine available bandwidth. For example, a server could ping the transmitting device to determine the available bandwidth between the server and the transmitting device. An individual user device (see, e.g., device 100 shown in FIG. 1 or one of devices 255-258 shown in FIG. 2), a communication server (see, e.g., communications server 251 shown in FIG. 2), or any combination thereof can determine the transmitting device's available bandwidth at block 1520.

At block 1530, the transmitting device can be instructed to transmit contextual communications at a rate consistent with the available bandwidth. The instruction to transmit contextual communications can be based on the available bandwidth determined at block 1520. For example, if the amount of available bandwidth is minimal, the transmitting device can be instructed to transmit contextual communications that don't use much bandwidth (e.g., intermittent video, periodically updated images, low-resolution video or grayscale video). In another example, if the amount of available bandwidth is substantial, the transmitting device can be instruction to transmit contextual communications regardless of the bandwidth used by the communications (e.g., high-resolution, color video at a standard refresh rate). By instructing the transmitting device to modify its operation, the system can optimize the available bandwidth at both the receiving device and at the transmitting device. An individual user device (see, e.g., device 100 shown in FIG. 1 or one of devices 255-258 shown in FIG. 2), a communication server (see, e.g., communications server 251 shown in FIG. 2), or any combination thereof can instruct the transmitting device at block 1530.

Figure 16:
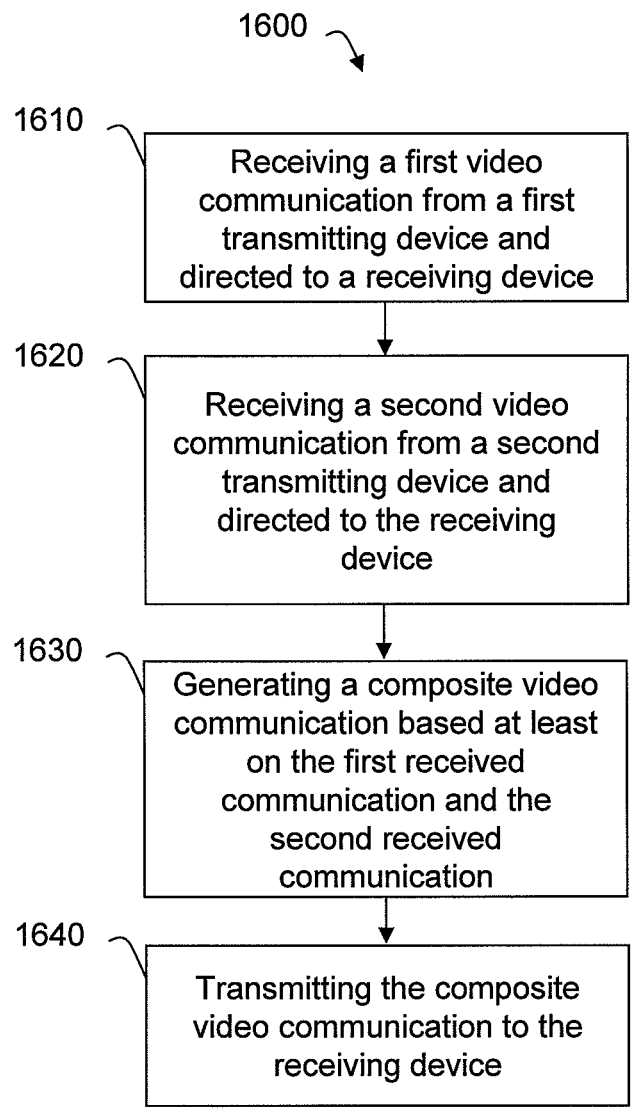

As previously discussed, a communications system can employ composite communications to optimize communications. For example, multiple communications from different users may each be directed to the same user. In such an example, the communications can be combined into a composite communication that includes the content of all of the communications. In this manner, the communications may be optimize the user of the network. FIG. 16 is a flowchart of illustrative process 1600 for facilitating communications in accordance with one embodiment of the invention. Process 1600 can be performed by a communication system (e.g., system 200 shown in FIG. 2). In some embodiments, process 1600 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1600 can be performed by multiple user devices (e.g., multiple instances of device 100) communicating in an ad-hoc network without a server (e.g., communicating through a peer-to-peer network). Process 1600 can begin with block 1610.

At block 1610, a first video communication is received. The first video communication is received from a transmitting device and directed to a receiving device. For example, the transmitting device and the receiving device may be in a subgroup or group and communicating accordingly. An individual user device (see, e.g., device 100 shown in FIG. 1 or one of devices 255-258 shown in FIG. 2), a communication server (see, e.g., communications server 251 shown in FIG. 2), or any combination thereof can receive the communication at block 1610.

At block 1620, a second video communication is received. The second video communication is received from a transmitting device and directed to the receiving device. Accordingly, the communication received at block 1620 may be directed to the same device as the communication received at block 1610. An individual user device (see, e.g., device 100 shown in FIG. 1 or one of devices 255-258 shown in FIG. 2), a communication server (see, e.g., communications server 251 shown in FIG. 2), or any combination thereof can receive the communication at block 1620.

At block 1630, a composite video communication is generated. The composite video communication can be generated based at least on the first received communication and the second received communication. For example, the composite video communication can be generated by combining the first received communication with the second received communication. In some embodiments, the composite video communication may be formed in a manner that allows the first and second communications to be extracted from the composite video communication at a later point in time. For example, after transmission, the first and second communications may be extracted by a user device for providing the communications to a user. In some embodiments, the composite video communication may be a single video feed. For example, each received video communication may be combined into a single video feed to form a composite video communication. In some embodiments, video communications may be combined by overlaying the communications in a manner that allows them to be separate at the receiving device. In some embodiments, video communications may be combined by dividing a video feed into different segments and assigning each segment to one of the video communications. In some embodiments, the composite video communication may have a size that is smaller than the aggregate size of the received communications. In other words, the composite video communication may have a size that is less than the sum of the sizes of the received communications that the composite represents. An individual user device (see, e.g., device 100 shown in FIG. 1 or one of devices 255-258 shown in FIG. 2), a communication server (see, e.g., communications server 251 shown in FIG. 2), or any combination thereof can generate the composite video communication at block 1630. In some embodiments, the server may be in the best position to generate a composite video communication because the server may be located at the intersection of the communications paths to each device.

At block 1640, the composite video communication can be transmitted to the receiving device. The composite video communication can be transmitted to the receiving device using any suitable mode of communication. For example, the composite video communication can be transmitted to the receiving device using an active mode of communication. In another example, the composite video communication can be transmitted to the receiving device using an intermediate mode of communication (e.g., as a contextual communication). An individual user device (see, e.g., device 100 shown in FIG. 1 or one of devices 255-258 shown in FIG. 2), a communication server (see, e.g., communications server 251 shown in FIG. 2), or any combination thereof can transmit the composite video communication at block 1640.

In some embodiments, after process 1600, the composite video communication may be presented to a user at the receiving device. For example, each component of a composite video communication may be presented to the user as separate communications. In some embodiments, each component may be extracted from the composite video communications and presented separately to the user.

In accordance with some embodiments, the process of generating composite video communications may be based on one or more other factors. In some embodiments, the process of generating composite video communications may be based on available bandwidth. For example, the process of generating composite video communications may be initiated if a system or an individual device determines a minimal amount of available bandwidth. In this manner, the minimal amount of available bandwidth can be used more efficiently with composite video communications. In some embodiments, the process of generating a composite video communication may be based on the applicable communication mode. For example, if the applicable communication mode is active, the composite video communication may include a robust version of each component communication (e.g., robust video corresponding to each received communication). In another example, if the applicable communication mode is intermediate, the composite video communication may include a contextual communication for each component.

Figure 17:
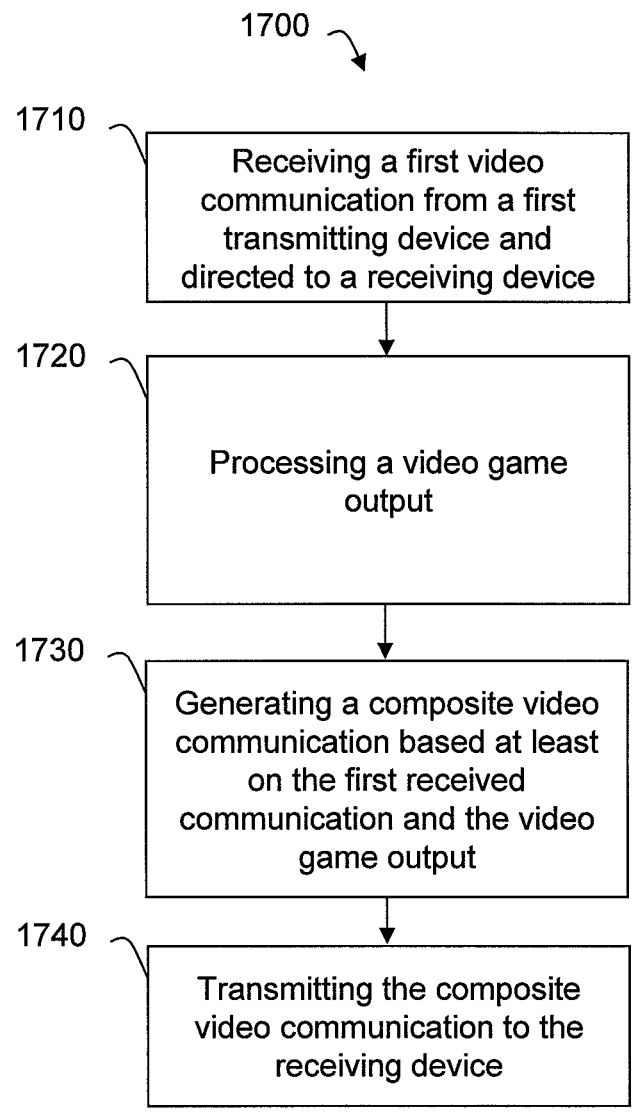

As previously discussed, composite video communications can include other information. In some embodiments, composite video communications may include a video game output. For example, multiple users can play a video game together while discussing the video game through a communication network. In such an example, rather than transmitting the video game signals separately from the communications, composite video communications can be generated that includes the video communications and the video game output. FIG. 17 is a flowchart of illustrative process 1700 for facilitating communications in accordance with one embodiment of the invention. Process 1700 can be performed by a communication system (e.g., system 200 shown in FIG. 2). In some embodiments, process 1700 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1700 can be performed by multiple user devices (e.g., multiple instances of device 100) communicating in an ad-hoc network without a server (e.g., communicating through a peer-to-peer network). Process 1700 can begin with block 1710.

At block 1710, a first video communication is received. Block 1710 is substantially similar to block 1610 of process 1600 and the previous description of the latter can be applied to the former.

At block 1720, a video game output can be processed. Processing a video game output can include any suitable operations performed in connection with a video game output. For example, processing a video game output can include generating the output. In another example, processing a video game output can include receiving a video game output from a server (e.g., a video game server). An individual user device (see, e.g., device 100 shown in FIG. 1 or one of devices 255-258 shown in FIG. 2), a communication server (see, e.g., communications server 251 shown in FIG. 2), or any combination thereof can process a video game output at block 1720.

At block 1730, a composite video communication is generated. The composite video communication can be generated based at least on the first received communication and the video game output. For example, the composite video communication can be generated by combining the received communication with the video game output. In some embodiments, the composite video communication may be formed in a manner that allows the communication and the video game output to be extracted from the composite video communication at a later point in time. For example, after transmission, the received communication and video game output may be extracted by a user device for providing the communication and video game output to a user. In some embodiments, the composite video communication may be a single video feed. In some embodiments, the composite video communication may have a size that is smaller than the aggregate size of the received communication and the video game output. In other words, the composite video communication may have a size that is less than the sum of the sizes of the individual components that the composite represents. An individual user device (see, e.g., device 100 shown in FIG. 1 or one of devices 255-258 shown in FIG. 2), a communication server (see, e.g., communications server 251 shown in FIG. 2), or any combination thereof can generate the composite video communication at block 1730.

At block 1740, the composite video communication can be transmitted to the receiving device. Block 1740 is substantially similar to block 1640 of process 1600 and the previous description of the latter can be applied to the former.

After process 1700, the video game output may then be provided to a user at the receiving device. In some embodiments, the video game output may be provided to the user at the receiving device in conjunction with a video game that the user is playing with other users of the communications network.

Figure 18:
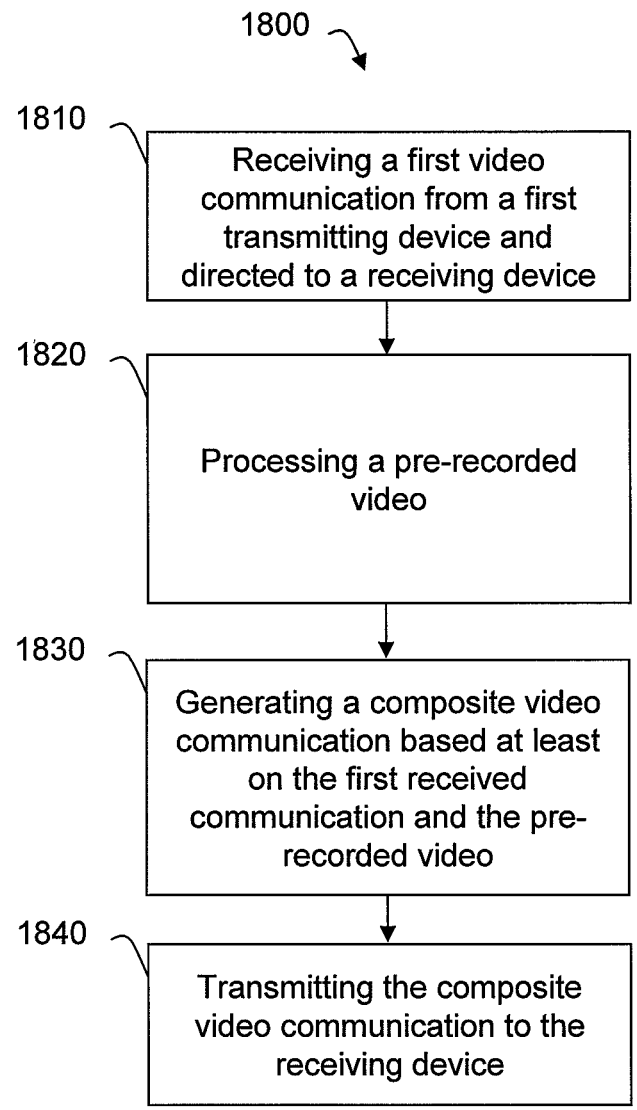

As previously discussed, composite video communications can include a pre-recorded video. For example, composite video communications can include a video clip, a television show or a movie. FIG. 18 is a flowchart of illustrative process 1800 for facilitating communications in accordance with one embodiment of the invention. Process 1800 can be performed by a communication system (e.g., system 200 shown in FIG. 2). In some embodiments, process 1800 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1800 can be performed by multiple user devices (e.g., multiple instances of device 100) communicating in an ad-hoc network without a server (e.g., communicating through a peer-to-peer network). Process 1800 can begin with block 1810.

At block 1810, a first video communication is received. Block 1810 is substantially similar to block 1610 of process 1600 and the previous description of the latter can be applied to the former.

At block 1820, a pre-recorded video can be processed. Processing a pre-recorded video can include any suitable operations performed in connection with a pre-recorded video. For example, processing a pre-recorded video can include accessing a database to retrieve a pre-recorded video. In another example, processing a pre-recorded video can include receiving the pre-recorded video from a server (e.g., a media server). An individual user device (see, e.g., device 100 shown in FIG. 1 or one of devices 255-258 shown in FIG. 2), a communication server (see, e.g., communications server 251 shown in FIG. 2), or any combination thereof can process a pre-recorded video at block 1820.

At block 1830, a composite video communication is generated. The composite video communication can be generated based at least on the first received communication and the pre-recorded video. For example, the composite video communication can be generated by combining the received communication with the pre-recorded video. In some embodiments, the composite video communication may be formed in a manner that allows the communication and the pre-recorded video to be extracted from the composite video communication at a later point in time. For example, after transmission, the received communication and the pre-recorded video may be extracted by a user device for providing the communications to a user. In some embodiments, the composite video communication may be a single video feed. In some embodiments, the composite video communication may have a size that is smaller than the aggregate size of the received communication and the pre-recorded video. In other words, the composite video communication may have a size that is less than the sum of the sizes of the individual components that the composite represents. An individual user device (see, e.g., device 100 shown in FIG. 1 or one of devices 255-258 shown in FIG. 2), a communication server (see, e.g., communications server 251 shown in FIG. 2), or any combination thereof can generate the composite video communication at block 1830.

At block 1840, the composite video communication can be transmitted to the receiving device. Block 1840 is substantially similar to block 1640 of process 1600 and the previous description of the latter can be applied to the former.

In some embodiments, the pre-recorded video may then be provided to a user at the receiving device. In some embodiments, the pre-recorded video may be provided to multiple users so that the users can discuss the video through the communications network.

As previously discussed, spatial audio can be provided. For example, audio from multiple communications may be received and the audio relating to each communication may be arbitrarily assigned different balances between the relative output channels to create the illusion of different locations. The different location can aid a user in distinguishing audio from different communications. For example, if the audio standard is stereo, audio relating to each communication may be assigned a different right/left channel balance to aid a user in distinguishing audio from different communications.

In some embodiments, audio relating to multiple communications can be mixed together based on the balancing. For example, audio relating to multiple communications can be mixed together in a way that helps a user distinguish the audio from each communication. For example, an arbitrary spatial location may be assigned to each received communication, and audio signals from the received communications may be mixed together based on the spatial locations. The combined audio signal may then be provided to the receiving user so that the user can distinguish amongst the different received communications.

In some embodiments, arbitrary spatial locations may be selected to approximate, or be consistent with, the layout of communications on a visual display. For example, if the received communications included video signals, each arbitrary spatial location may correspond to an area of a visual display at which the corresponding video signals will be displayed. In this manner, the combination of the video signals and the combined audio signal may help the receiving user associate each video signal with the corresponding audio.

Figure 19:
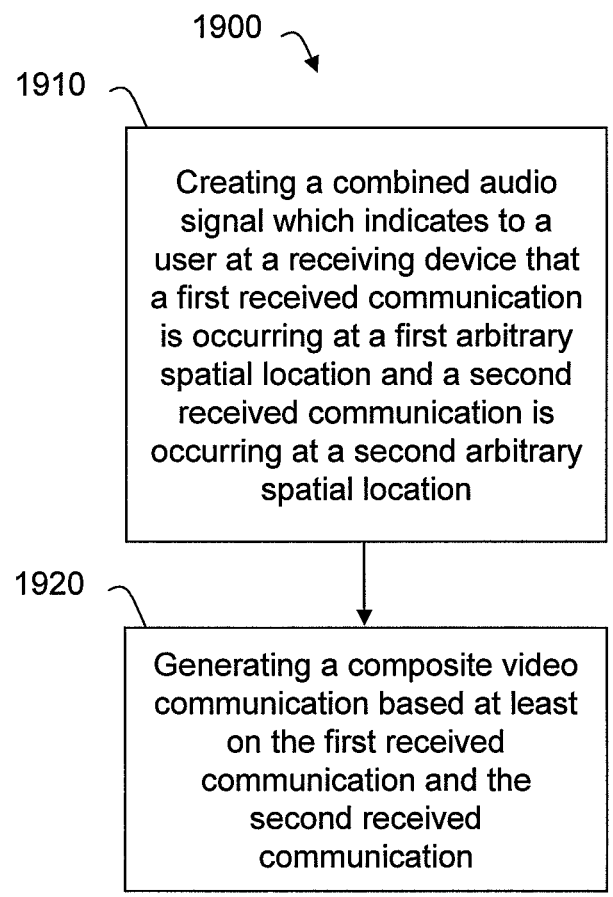

In some embodiments, spatial audio mixing may be provided in conjunction with a composite video communication. FIG. 19 is a flowchart of illustrative process 1900 for facilitating communications in accordance with one embodiment of the invention. Process 1900 can be performed by a communication system (e.g., system 200 shown in FIG. 2). In some embodiments, process 1900 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 1900 can be performed by multiple user devices (e.g., multiple instances of device 100) communicating in an ad-hoc network without a server (e.g., communicating through a peer-to-peer network). Process 1900 can begin with block 1910.

At block 1910, a combined audio signal can be created. The combined audio signal can be created so that it indicates to a user at a receiving device that a first received communication is occurring at a first arbitrary spatial location. Moreover, the combined audio signal can be created so that it indicates to the user that a second received communication is occurring at a second arbitrary spatial location. In this manner, the receiving user can distinguish the audio from the first and second communications. It is understood that the arbitrary spatial locations are not necessarily tied to any particular physical location but are merely terms to describe the effect of mixing audio to help a listener distinguish. In some embodiments, the audio may be mixed by distributing each communication differently into stereo audio (e.g., left/right). For example, the audio may be mixed to represent one received communication on the left and another received communication on the right. In another example, the audio may be mixed into stereo audio in a more complicated fashion to represent received communications at locations in a virtual space that includes distinctions between left and right as well as near and far. In some embodiments, the audio may be mixed into surround sound audio by distributing each communication differently on the various surround sound channels. An individual user device (see, e.g., device 100 shown in FIG. 1 or one of devices 255-258 shown in FIG. 2), a communication server (see, e.g., communications server 251 shown in FIG. 2), or any combination thereof can create a combined audio signal at block 1910.

At block 1920, a composite video communication can be generated. The composite video communication can be based at least on the first received communication and the second received communication. For example, the composite video communication can be generated by combining the video of the first and second received communications with the combined audio signal. When provided to a user, the combined audio signal may assist the user in distinguishing between the different communications. In some embodiments, the composite video communication can be generated by a receiving device and then displayed to the device's user. In some embodiments, the composite video communication can be generated by a server and then transmitted to a receiving device. In some embodiments, the composite video communication may be formed in a manner that allows the different communications to be extracted from the composite video communication at a later point in time. For example, if the composite video communication is transmitted to another device, the received communications may be extracted by a user device for providing the communications to a user. In some embodiments, the combined audio signal may be transmitted to a receiving device along with the composite video communication. In other embodiments, the composite video communication may be generated based on the received video communications as well as the combined audio signal so that the composite communication includes both the received video communications and the combined audio signal. In some embodiments, the composite video communication may be a single video feed. For example, the composite video communication can be a single video feed with a built-in audio component. In some embodiments, the composite video communication may have a size that is smaller than the aggregate size of the received communications and the combined audio signal. In other words, the composite video communication may have a size that is less than the sum of the sizes of the individual components that the composite represents. An individual user device (see, e.g., device 100 shown in FIG. 1 or one of devices 255-258 shown in FIG. 2), a communication server (see, e.g., communications server 251 shown in FIG. 2), or any combination thereof can generate a composite video communication at block 1920.

While the embodiment shown in FIG. 19 shows spatial audio mixing with two received communications, it is understood that the principles of spatial audio mixing can be applied to other concepts associated with a communication. For example, spatial audio mixing can be applied to video game output (see, e.g., FIG. 17 and related discussion) or pre-recorded video (see, e.g., FIG. 17 and related discussion) to assist a user in distinguishing the different content. In some embodiments, the received communications, the other content (e.g., video game output or pre-recorded video) and the combined audio signal can be collectively used to generate a composite video communication.

After process 1900, the composite video communication can be transmitted to a receiving device and provided to a user at the receiving device.

Figure 20:
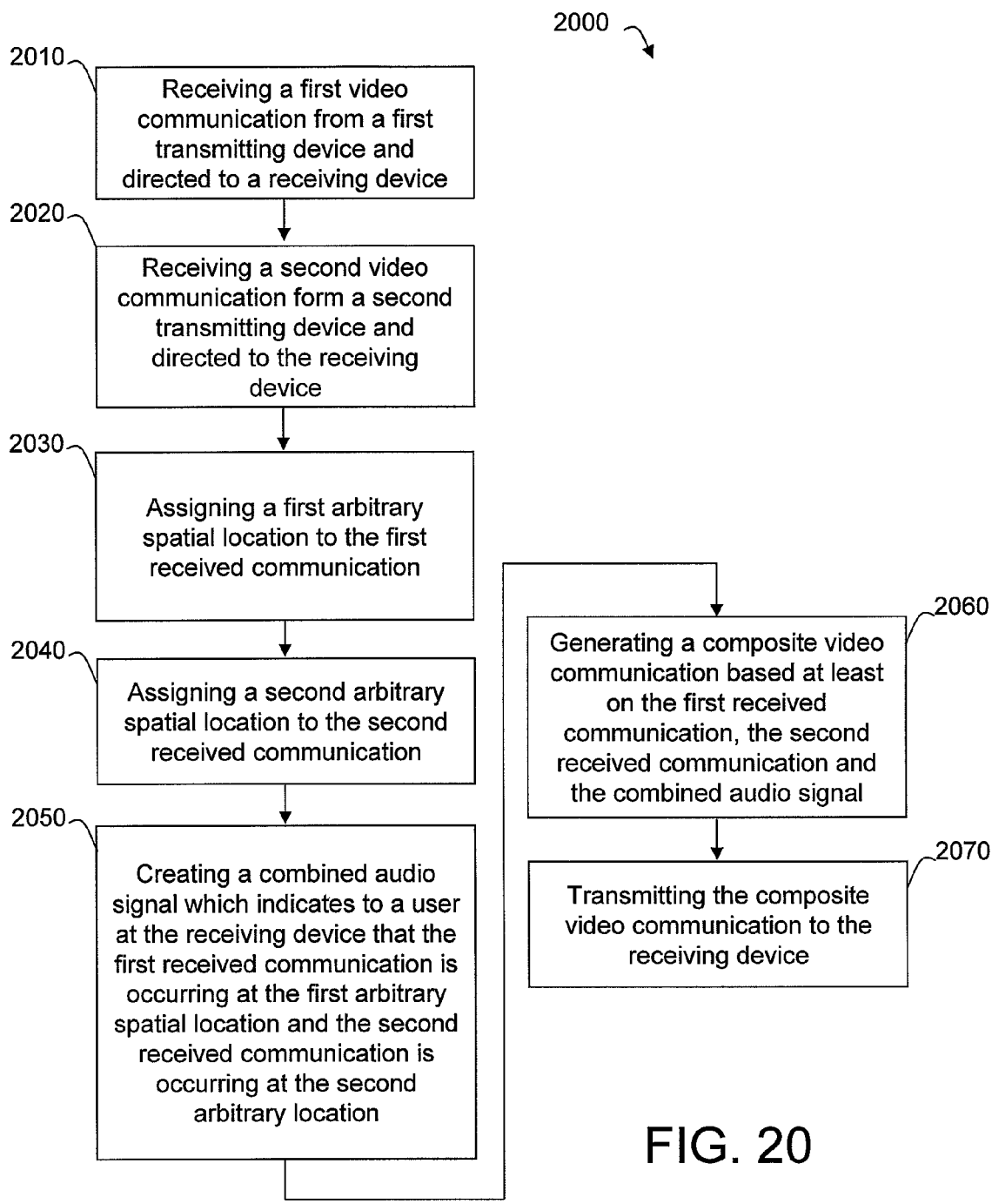

FIG. 20 is a flowchart of illustrative process 2000 for facilitating communications in accordance with one embodiment of the invention. Process 2000 can be performed by a communication system (e.g., system 200 shown in FIG. 2). In some embodiments, process 2000 can be performed by multiple user devices communicating in a network that includes a server (e.g., devices 255-258 shown in FIG. 2), a server in a network with multiple user devices (e.g., server 251 shown in FIG. 2) or any combination thereof. In some embodiments, process 2000 can be performed by multiple user devices (e.g., multiple instances of device 100) communicating in an ad-hoc network without a server (e.g., communicating through a peer-to-peer network). Process 2000 can begin with block 2010.

At block 2010, a first video communication is received. The first video communication is received from a transmitting device and directed to a receiving device. Block 2010 is substantially similar to block 1610 of process 1600 and the previous description of the latter can be applied to the former.

At block 2020, a second video communication is received. The second video communication is received from a transmitting device and directed to the receiving device. Block 2020 is substantially similar to block 1620 of process 1600 and the previous description of the latter can be applied to the former.

At block 2030, a first arbitrary spatial location can be assigned to the first received communication. As previously discussed, the arbitrary spatial locations used for spatial audio mixing are purely arbitrary and do not have any connection to a location in physical space. However, in some embodiments, the arbitrary spatial locations may be based on the area in a display (see, e.g., display 109 shown in FIG. 1) where the corresponding communication (e.g., video) will be displayed. For example, the arbitrary spatial locations may be selected to approximate, or be consistent with, the layout of communications on a visual display. Using the embodiment shown in FIG. 6 to provide context, the arbitrary spatial location corresponding to user 9 may be assigned to the right side. In this manner, the audio portion of the communication from user 9 can appear to be originating from the right so that a receiving user can easily associate the audio with user 9. An individual user device (see, e.g., device 100 shown in FIG. 1 or one of devices 255-258 shown in FIG. 2), a communication server (see, e.g., communications server 251 shown in FIG. 2), or any combination thereof can assign an arbitrary spatial location at block 2030.

At block 2040, a second arbitrary spatial location can be assigned to the first received communication. As previously discussed, the arbitrary spatial locations used for spatial audio mixing are purely arbitrary and do not have any connection to a location in physical space. However, in some embodiments, the arbitrary spatial locations may be based on the area in a display (see, e.g., display 109 shown in FIG. 1) where the corresponding communication (e.g., video) will be displayed. An individual user device (see, e.g., device 100 shown in FIG. 1 or one of devices 255-258 shown in FIG. 2), a communication server (see, e.g., communications server 251 shown in FIG. 2), or any combination thereof can assign an arbitrary spatial location at block 2040.

At block 2050, a composite video communication can be generated. The composite video communication can be based at least on the first received communication, the second received communication and the combined audio signal. Block 2050 is substantially similar to block 1910 of process 1900 and the previous description of the latter can be applied to the former.

At block 2060, a composite video communication can be generated. The composite video communication can be based at least on the first received communication, the second received communication and the combined audio signal. Block 2060 is substantially similar to block 1920 of process 1900 and the previous description of the latter can be applied to the former.

At block 2070, the composite video communication is transmitted to the receiving device. Block 2070 is substantially similar to block 1640 of process 1600 and the previous description of the latter can be applied to the former.

While the previous examples disclose combined audio signals based on first and second arbitrary spatial locations, it is understood that any number of arbitrary spatial locations can be used in accordance with the disclosure. For example, the number of arbitrary spatial locations may be based on the number of received communications. In another example, the number of arbitrary spatial locations may be based on the number of groups or subgroups of which a user is a member.

In one illustrative embodiment, emergency workers can employ the methods and systems disclosed herein for efficient communications. For example, various emergency workers may be connected by radio and maintained in an instant ready-on mode of communication. In some embodiments, workers can be connected even if the workers are not from the same department (e.g., firefighters, police officers, and emergency medical technicians). In one scenario a first emergency worker may broadcast to an entire group and supervisor the status of a problem in one geographic area (e.g., a particular location within an emergency scene). After receiving the communication, one or more other workers may then realize that they are nearby and attempt to form group that includes the original worker and all others nearby. As the group is formed, the participating users switch to an intermediate communication mode and send and receive contextual communications. Individual workers can then enter into active modes of communications and to communicate amongst each other. For example, two or more workers can then communicate to discuss the problem. At some point, an additional worker may then join the group. For example, the new worker may "knock" if the subgroup group is private or simply join the group if it is not private. Once the new worker has joined, she can switch to an intermediate mode of communication with the workers in the group. Once a member of the group, the worker can then switch to an active mode of communications with the workers in the group to discuss the problem and find a solution. While the participating users are working towards a solution, other high-priority communications directed to all emergency workers using the network may override the smaller conversations (e.g., to provide updates on the general status of the emergency effort). The supervisor may be presented with a visualization of all communications and may selectively receive communications from one or more groups if he chooses. If the supervisor receives communications from the previously discussed group and identifies a need for additional help, he may notify other emergency workers of the problem. Once the group has adequately resolved the problem, a participating user may transmit a notice to all emergency workers using the network to inform them of the resolution. A user in the group can then dissolve the group, and the network can then maintain an instant ready-on mode of communication between the users of the former group.

The various embodiments of the invention may be implemented by software, but can also be implemented in hardware or a combination of hardware and software. The invention can also be embodied as computer readable code on a computer readable medium. The computer readable medium can be any data storage device that can store data which can thereafter be read by a computer system. Examples of a computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments of the invention are presented for purposes of illustration and not of limitation.

What is claimed is:

1. A method for facilitating dynamic communications amongst multiple users, the method comprising:
   determining a number of live video communications being received, wherein the live video communications being received comprises at least a first live video communication and a second live video communication;
   receiving the first live video communication sent by a first transmitting device and directed to a receiving device;
   receiving the second live video communication sent by a second transmitting device and directed to the receiving device;
   assigning a first arbitrary spatial location within a display of the receiving device to the first received live video communication;
   assigning a second arbitrary spatial location within the display of the receiving device to the second received live video communication;
   creating a combined audio signal which indicates to a user at the receiving device that the first received live video communication is occurring at the first arbitrary spatial location within the display of the receiving device and the second received live video communication is occurring at the second arbitrary spatial location within the display of the receiving device;
   generating a composite video communication based at least on the first received live video communication, the second received live video communication, and the combined audio signal; and
   transmitting the composite video communication to the receiving device.

2. The method of claim 1, wherein the size of the composite video communication is less than the aggregate size of the first received live video communication and the second received live video communication.

3. The method of claim 1, wherein the combined audio signal assists the user in distinguishing the first received live video communication from the second received live video communication.

4. The method of claim 1, wherein:
   the first arbitrary spatial location corresponds to a left side of the display of the receiving device; and
   audio from the first received communication is predominately on a left channel of the combined audio signal.

5. The method of claim 1, further comprising:
   providing the composite video communication to the user at the receiving device, wherein the composite video communication is provided so that video from the first received live video communication is displayed at a location within the display of the receiving device corresponding to the first arbitrary spatial location.

6. The method of claim 1, further comprising:
   receiving a third live video communication, the third received live video communication being sent by a third transmitting device and directed to the receiving device; and
   assigning a third arbitrary spatial location within the display of the receiving device to the third received live video communication, wherein:
      creating further comprises creating the combined audio signal to indicate to the user that the third received live video communication is occurring at the third arbitrary spatial location within the display of the receiving device; and
      generating further comprises generating the composite video communication based at least on the third received live video communication.

7. A method for facilitating dynamic communications amongst multiple users, the method comprising:
  determining a number of live video communications being received, wherein the live video communications being received comprises at least a first live video communication and a second live video communication; and
  identifying arbitrary spatial locations to assign to the received live communications based on the number of received live video communications such that each of the arbitrary spatial locations corresponds to one of the received live video communications;
  creating a combined audio signal which indicates to a user at a receiving device that the first received live video communication is occurring at a first arbitrary spatial location of the identified arbitrary spatial locations within a display of the receiving device and the second received live video communication is occurring at a second arbitrary spatial location of the identified arbitrary spatial locations within the display of the receiving device; and
  generating a composite video communication based at least on the first received live video communication and the second received live video communication.

8. The method of claim 7, wherein the size of the composite video communication is less than the aggregate size of the first received live video communication and the second received live video communication.

9. The method of claim 7, wherein the combined audio signal assists the user in distinguishing the first received live video communication from the second received live video communication.

10. The method of claim 7, wherein:
  the first arbitrary spatial location corresponds to a right side of the display of the receiving device; and
  audio from the first received communication is predominately on a right channel of the combined audio signal.

11. The method of claim 7, wherein the determined number of received live video communications comprises the first received live video communication and the second received live video communication, the method further comprises:
  receiving a first video feed that corresponds to the first received live video communication, the first video feed being sent by a first transmitting device and directed to the receiving device;
  receiving a second video feed that corresponds to the second received live video communication, the second video feed being sent by a second transmitting device and directed to the receiving device.

12. The method of claim 7, further comprising:
  assigning the first arbitrary spatial location of the identified arbitrary spatial locations within the display of the receiving device to the first received live video communication;
  assigning the second arbitrary spatial location of the identified arbitrary spatial locations within the display of the receiving device to the second received live video communication.

13. The method of claim 7, further comprising:
  transmitting the composite video communication and the combined audio signal to the receiving device.

14. The method of claim 13, further comprising:
  providing the composite video communication and the combined audio signal to the user at the receiving device, wherein the composite video communication is provided so that video from the first received live video communication is displayed at a location within the display screen of the receiving device corresponding to the first arbitrary spatial location of the identified arbitrary spatial locations.

15. The method of claim 7, wherein:
  the live video communications being received further comprises a third live video communication;
  creating further comprises creating the combined audio signal to indicate to the user that the third received live video communication is occurring at a third arbitrary spatial location of the identified arbitrary spatial locations within the display screen of the receiving device; and
  generating further comprises generating the composite video communication based at least on the third received live video communication.

16. The method of claim 15, further comprising:
  receiving the third live video communication, the third received communication being sent by a third transmitting device and directed to the receiving device; and
  assigning the third arbitrary spatial location to the third received communication.

17. The method of claim 1, wherein the composite video communication is provided to the user at the receiving device such that:
  the first received live video communication is displayed at the first arbitrary spatial location within the generated composite video; and
  the second received live video communication is displayed at the second arbitrary spatial location within the generated composite video.

18. The method of claim 1, wherein one of:
  the first transmitting device and the receiving device are the same; and
  the second transmitting device and the first receiving device are the same.

19. The method of claim 1, wherein transmitting further comprises:
  transmitting the composite video communication based on at least one of an active mode of communication and an intermediate mode of communication.

20. The method of claim 1, wherein generating further comprises:
  generating the composite video communication based on an applicable communication mode.

21. The method of claim 20, wherein:
  the applicable mode of communication comprises one of an active mode of communication and an intermediate mode of communication; and
  if the applicable mode of communication is:
    the active mode of communication, the composite video communication comprises robust versions of the first received live video communication and the second received live video communication; and
    the intermediate mode of communication, the composite video communication comprises contextual communications of the first received live video communication and the second received live video communication.

22. The method of claim 1, wherein at least one of the first transmitting device and the second transmitting device are within at least one of a group and a subgroup with the receiving device.

23. The method of claim 4, wherein:
  the second arbitrary spatial location corresponds to a right side of the display of the receiving device; and audio from the second received communication is predominately on a right channel of the combined audio signal.

24. A method for facilitating dynamic communications amongst multiple users, the method comprising:
   receiving a first live video communication sent by a first transmitting device and directed to a receiving device;
   receiving a second live video communication sent by a second transmitting device and directed to the receiving device;
   determining a number of live video communications received, the live video communications received comprising at least the received first live video communication and the received second live video communication;
   identifying arbitrary spatial locations to assign to the received live video communications based on the number of received live video communications such that each of the arbitrary spatial locations corresponds to one of the received live video communications;
   assigning a first arbitrary spatial location of the identified arbitrary spatial locations within a display of the receiving device to the first received live video communication;
   assigning a second arbitrary spatial location of the identified arbitrary spatial locations within the display of the receiving device to the second received live video communication;
   creating a combined audio signal which indicates to a user at the receiving device that the first received live video communication is occurring at the first arbitrary spatial location within the display of the receiving device and the second received live video communication is occurring at the second arbitrary spatial location within the display of the receiving device;
   generating a composite video communication based at least on the first received live video communication, the second received live video communication, and the combined audio signal; and
   transmitting the composite video communication to the receiving device.

25. The method of claim 24, wherein assigning the first and second arbitrary spatial locations is based on the identified arbitrary spatial locations.

* * * * *